(12) United States Patent
Oya et al.

(10) Patent No.: US 11,897,810 B2
(45) Date of Patent: Feb. 13, 2024

(54) WINDSHIELD AND WINDSHIELD MANUFACTURING METHOD

(71) Applicant: Nippon Sheet Glass Company, Limited, Tokyo (JP)

(72) Inventors: Kazuaki Oya, Tokyo (JP); Fumiyoshi Kondo, Tokyo (JP); Shinya Okamoto, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 633 days.

(21) Appl. No.: 16/321,387

(22) PCT Filed: Jul. 27, 2017

(86) PCT No.: PCT/JP2017/027329
§ 371 (c)(1),
(2) Date: Jan. 28, 2019

(87) PCT Pub. No.: WO2018/021499
PCT Pub. Date: Feb. 1, 2018

(65) Prior Publication Data
US 2019/0169068 A1    Jun. 6, 2019

(30) Foreign Application Priority Data
Jul. 29, 2016  (JP) .................. 2016-150844

(51) Int. Cl.
*B32B 17/10* (2006.01)
*B60R 11/04* (2006.01)
(Continued)

(52) U.S. Cl.
CPC ............ *C03C 17/3417* (2013.01); *B32B 7/12* (2013.01); *B32B 17/10* (2013.01);
(Continued)

(58) Field of Classification Search
CPC .................. B60R 11/04; B60R 2011/0075
See application file for complete search history.

(56) References Cited

U.S. PATENT DOCUMENTS 6,737,151 B1    5/2004  Smith
6,740,211 B2 *  5/2004  Thomsen .......... B32B 17/10036
                                               156/109
(Continued)

FOREIGN PATENT DOCUMENTS

EP    2796288 A1    10/2014
JP    2000-86293 A   3/2000
(Continued)

OTHER PUBLICATIONS

International Search Report for PCT/JP2017/027329 (PCT/ISA/210) dated Sep. 12, 2017.
(Continued)

*Primary Examiner* — Alicia J Weydemeyer
(74) *Attorney, Agent, or Firm* — Birch, Stewart, Kolasch & Birch, LLP

(57) ABSTRACT

The present invention is a windshield for an automobile on which an information acquisition device configured to acquire information from the outside of a vehicle by emitting and/or receiving light can be arranged. The windshield includes: a laminated glass including an information acquisition region that is opposite to the information acquisition device and through which the light passes; and an antifog sheet in which at least a sticky layer, a substrate film, and an antifog layer are layered in this order, the sticky layer being attached to at least a surface on a vehicle interior side of the information acquisition region. The laminated glass includes at least one glass plate in which surface concentrations of tin oxide in two principal surfaces are different, and a surface of
(Continued)

the glass plate in which the concentration of tin oxide is higher faces the vehicle interior side.

19 Claims, 24 Drawing Sheets

(51) Int. Cl.
*B32B 7/12* (2006.01)
*B32B 27/20* (2006.01)
*B60R 11/00* (2006.01)
*C03C 17/34* (2006.01)
*B60J 1/00* (2006.01)

(52) U.S. Cl.
CPC .. *B32B 17/10128* (2013.01); *B32B 17/10238* (2013.01); *B32B 27/20* (2013.01); *B60J 1/00* (2013.01); *B60J 1/008* (2013.01); *B60R 11/04* (2013.01); *C03C 17/34* (2013.01); *B32B 17/10036* (2013.01); *B32B 17/10293* (2013.01); *B32B 2605/08* (2013.01); *B60R 2011/0075* (2013.01); *C03C 2217/476* (2013.01); *C03C 2218/365* (2013.01)

(56) References Cited

U.S. PATENT DOCUMENTS

| | | |
|---|---|---|
| 2005/0284516 A1 | 12/2005 | Koll |
| 2007/0009714 A1 | 1/2007 | Lee et al. |
| 2007/0077399 A1* | 4/2007 | Borowiec ............... C08J 7/043 428/195.1 |
| 2008/0210287 A1 | 9/2008 | Volpp et al. |
| 2009/0126859 A1 | 5/2009 | Cadwallader et al. |
| 2011/0281095 A1 | 11/2011 | Timmermann |
| 2012/0103960 A1 | 5/2012 | Bressand et al. |
| 2013/0302599 A1 | 11/2013 | Oya et al. |
| 2017/0305240 A1* | 10/2017 | Aoki ................. B32B 17/10165 |

FOREIGN PATENT DOCUMENTS

| | | |
|---|---|---|
| JP | 2000-119048 A | 4/2000 |
| JP | 2004-67394 A | 3/2004 |
| JP | 2005-206447 A | 8/2005 |
| JP | 2006264458 A * | 10/2006 |
| JP | 2010-180068 A | 8/2010 |
| JP | 2012-530646 A | 12/2012 |
| WO | WO 00/64670 A1 | 11/2000 |
| WO | WO 2007/081025 A1 | 7/2007 |
| WO | WO 2012/073685 A1 | 6/2012 |
| WO | WO 2015/083479 A1 | 6/2015 |
| WO | WO 2015/093168 A1 | 6/2015 |
| WO | WO 2015/170771 A1 | 11/2015 |
| WO | WO-2015170771 A1 * | 11/2015 ............ C03C 3/087 |

OTHER PUBLICATIONS

Written Opinion of the International Searching Authority for PCT/JP2017/027329 (PCT/ISA/237) dated Sep. 12, 2017.
Extended European Search Report for European Application No. 21154997.7, dated Jun. 7, 2021.
Extended European Search Report dated Feb. 21, 2020, for European Application No. 17834501.3.
Japanese Office Action dated Jul. 4, 2019, for Japanese Patent Application No. 2018-530403, with English translation.

* cited by examiner

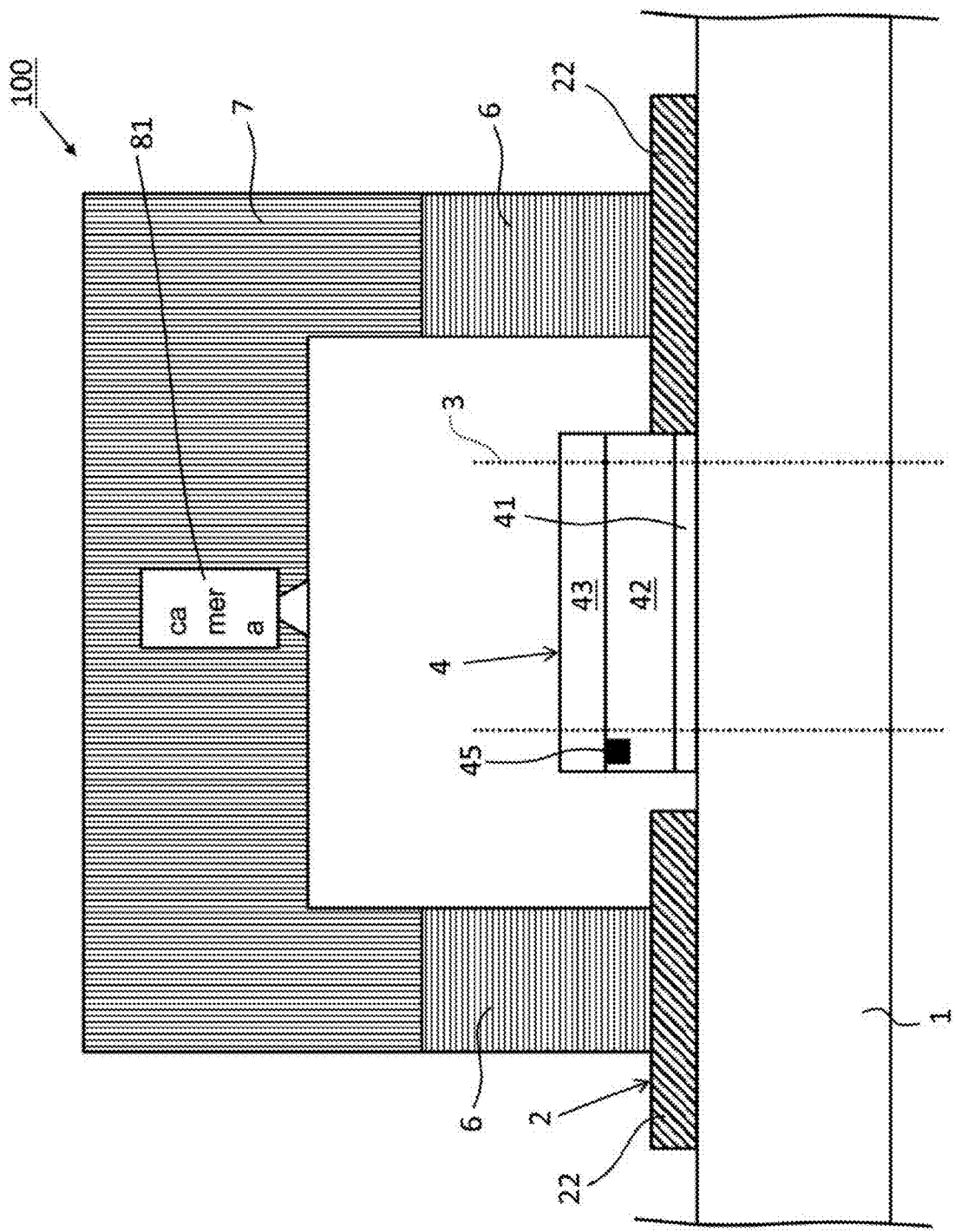

Fig. 18
Example
Comparative Example
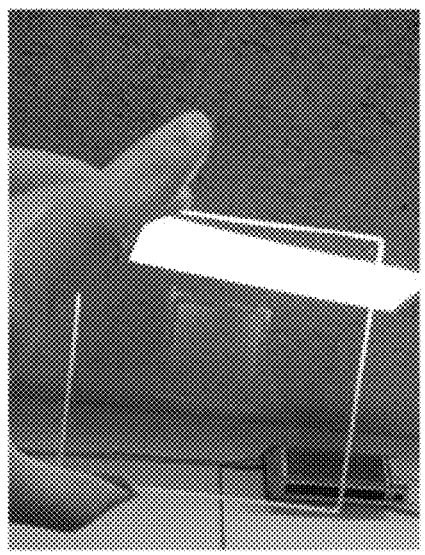
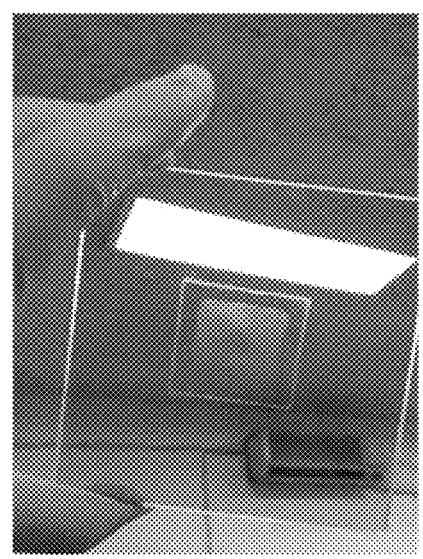

WINDSHIELD AND WINDSHIELD MANUFACTURING METHOD

TECHNICAL FIELD

The present invention relates to a windshield for an automobile and a windshield manufacturing method.

BACKGROUND ART

In general, windshields for automobiles are provided with a blocking layer for blocking a field of vision from the outside of a vehicle. This blocking layer is provided along the peripheral edge portion of the windshield, and conceals an adhesive or the like for attaching the windshield to the automobile from the outside of the vehicle.

In recent years, an in-vehicle system including a camera or the like for taking images of the outside of the vehicle has been proposed. With this in-vehicle system, for example, it is possible to recognize an oncoming vehicle, a preceding vehicle, a pedestrian, a traffic sign, a traffic lane line, and the like by analyzing images of subjects that have been taken using the camera, and thereby perform various types of driving support such as notifying a driver of danger, and the like.

However, in such an in-vehicle system, it is often the case that an information acquisition device such as a camera is installed at a position that is blocked by the blocking layer, such as a position near a supporting portion of a rearview mirror, or at a position near such a position. In such a case, there is a possibility that the blocking layer will inhibit the information acquisition device from acquiring information about the outside of the vehicle.

Therefore, conventionally, it has been proposed to provide a transmission window in a partial region of the blocking layer (Patent Literature 1, for example). For example, a region (transmission window) with high visible-light transmittance can be formed in a portion of the blocking layer by replacing a portion of an interlayer with a material with high visible-light transmittance or providing a region in which ceramic is not layered. The information acquisition device installed inside the vehicle can use the transmission window as an information acquisition region through which light passes to acquire information about the outside of the vehicle without being inhibited by the blocking layer.

CITATION LIST

Patent Literature

Patent Literature 1: JP 2010-180068A

SUMMARY OF INVENTION

Technical Problem

Patent Literature 1 proposes that a coating for providing an antifog function is applied to a windshield in order to prevent fogging. However, the information acquisition region is a relatively small region. Therefore, it is difficult to uniformly apply a coating on such a small region, and there is a possibility that unevenness (roughness) with which the information acquisition device will be inhibited from acquiring information is formed on the surface of the coating.

To address this, a method of attaching an antifog sheet with antifog capabilities instead of a coating via a sticky layer is conceivable as an alternative of the method for imparting the antifog function to the information acquisition region. It is easy to attach a film even to a small region such as the information acquisition region. Therefore, using a transparent antifog sheet with substantially no warping makes it easy to impart the antifog function to the information acquisition region without inhibiting the information acquisition device from acquiring the information.

However, the inventors of the present invention found a problem that the antifog sheet as described above becomes opaque due to temporal change. It was found that one of the reasons for this is that alkali components contained in a glass plate constituting a windshield are deposited on the antifog sheet side, and thus the antifog sheet becomes opaque. If the antifog sheet becomes opaque in such a manner, there is a risk that accurate irradiation of light from the information acquisition device cannot be performed or the information acquisition device cannot receive light accurately, as in a case where the glass fogs up. Accordingly, a distance between vehicles or the like may be inaccurately calculated.

The present invention was made in order to solve the foregoing problems, and it is an object thereof to provide a windshield to which an information acquisition device that emits and/or receives light can be attached and with which light can be accurately emitted and/or received and information can be accurately processed, and a method for manufacturing the windshield.

Solution to Problem

With a first windshield according to the present invention and a method for manufacturing the windshield, an invention with the following aspects is provided.

Aspect 1 is a windshield for an automobile on which an information acquisition device configured to acquire information from the outside of a vehicle by emitting and/or receiving light can be arranged, the windshield including:
  a laminated glass including an information acquisition region that is opposite to the information acquisition device and through which the light passes; and
  an antifog sheet in which at least a sticky layer, a substrate film, and an antifog layer are layered in this order, the sticky layer being attached to at least a surface on a vehicle interior side of the information acquisition region,
  wherein the laminated glass includes at least one glass plate in which surface concentrations of tin oxide in two principal surfaces are different, and a surface of the glass plate in which the concentration of tin oxide is higher faces the vehicle interior side.

Aspect 2 is the windshield according to aspect 1, further including:
  a blocking layer that is provided on the laminated glass, blocks a field of vision from the outside of the vehicle, and is provided with an opening arranged to correspond to the information acquisition region; and
  a bracket for attaching the information acquisition device at a position that is opposite to the opening,
  wherein the bracket is arranged around the opening and fixed such that at least a portion of the bracket is blocked by the blocking layer.

Aspect 3 is the windshield according to aspect 1 or 2,
  wherein the glass plate in which the surface concentrations of tin oxide in the two principal surfaces are different is made of float glass, and
  a surface of the two principal surfaces of the float glass in which the concentration of tin oxide is higher is taken as a bottom surface, and a surface in which the concentration of tin oxide is lower is taken as a top surface.

Aspect 4 is the windshield according to aspect 3,
wherein the laminated glass includes an inner glass plate arranged on a vehicle interior side, an outer glass plate arranged on a vehicle exterior side, and an interlayer arranged between the inner glass plate and the outer glass plate, the inner glass plate and the outer glass plate are made of the float glass, and the top surface of the inner glass plate and the top surface of the outer glass plate are in contact with the interlayer.

Aspect 5 is the windshield according to aspect 3,
wherein the laminated glass includes an inner glass plate arranged on a vehicle interior side, an outer glass plate arranged on a vehicle exterior side, and an interlayer arranged between the inner glass plate and the outer glass plate, the inner glass plate and the outer glass plate are made of the float glass, and the top surface of the inner glass plate and the bottom surface of the outer glass plate are in contact with the interlayer.

Aspect 6 is the windshield according to aspect 2,
wherein the planar size of the antifog sheet is larger than the planar size of the opening of the blocking layer.

Aspect 7 is the windshield according to aspect 6,
wherein the bracket is formed in a frame shape, and the planar size of the antifog sheet is smaller than the internal size of the bracket.

Aspect 8 is the windshield according to aspect 2,
wherein a planar size of the antifog sheet is smaller than a planar size of the opening of the blocking layer.

Aspect 9 is the windshield according to aspect 2,
wherein the planar size of the opening of the blocking layer is larger than the planar size of the information acquisition region, and the planar size of the antifog sheet is larger than the planar size of the information acquisition region and smaller than the planar size of the opening of the blocking layer.

Aspect 10 is the windshield according to any one of aspects 2 to 8,
wherein at least a portion of the edge of the antifog sheet is in contact with the edge of the opening of the blocking layer.

Aspect 11 is the windshield according to aspect 10,
wherein an imaging device for taking images of the outside of the vehicle through the information acquisition region and a laser device for emitting and/or receiving a ray of light that serve as the information acquisition devices are lined up in a horizontal direction, and a portion where the edge of the opening of the blocking layer and the edge of the antifog sheet are in contact with each other is arranged on the imaging device side.

Aspect 12 is the windshield according to any one of aspects 1 to 11,
wherein the total thickness of the substrate film and the antifog layer of the antifog sheet is larger than the thickness of the blocking layer.

Aspect 13 is the windshield according to aspect 12,
wherein the thickness of the substrate film of the antifog sheet is larger than the thickness of the blocking layer.

Aspect 14 is the windshield according to any one of aspects 1 to 13,
wherein the interlayer contains heat-ray absorbing particles, and the particles are not arranged in a region of the interlayer that overlaps the blocking layer and the opening in a plan view, and are arranged in the other region.

Aspect 15 is the windshield according to any one of aspects 1 to 14,
wherein the antifog layer contains at least one type of polymer selected from the group consisting of urethane resin, epoxy resin, acrylic resin, polyvinyl acetal resin, and polyvinylalcohol resin, and the polymer is contained in an amount of 50 mass % or more and 99 mass % or less.

Aspect 16 is the windshield according to any one of aspects 1 to 15,
wherein the antifog sheet is formed in a rectangular shape in a plan view, and corner portions of the antifog sheet are rounded.

Aspect 17 is the windshield according to aspect 16,
wherein at least one corner portion of the corner portions of the antifog sheet has a smaller radius of curvature of roundness than those of the other corner portions.

Aspect 18 is the windshield according to any one of aspects 1 to 17,
wherein the substrate sheet is made of a material having a thermal conductivity of $5\times10^{-4}$ cal/cm·sec·° C. or less.

Aspect 19 is the windshield according to any one of aspects 1 to 18,
wherein the antifog layer contains a surfactant.

Aspect 20 is the windshield according to any one of aspects 1 to 19,
wherein the antifog sheet is formed to have a trapezoidal cross section in which a side located on the antifog layer side is shorter than a side located on the substrate film side.

Aspect 21 is the windshield according to aspect 20,
wherein an imaging device for taking images of the outside of a vehicle through the information acquisition region and a laser device for emitting and/or receiving a ray of light that serve as the information acquisition devices are lined up in a horizontal direction, and in the trapezoidal shape seen in the antifog sheet, a leg located on a side on which the laser device is arranged is inclined at a larger angle than an angle at a leg located on a side on which the imaging device is arranged is inclined.

Aspect 22 is the windshield according to any one of aspects 1 to 21,
wherein the substrate film includes a plurality of layers.

Aspect 23 is a method for manufacturing a windshield for an automobile on which an information acquisition device configured to acquire information from the outside of a vehicle by emitting and/or receiving light can be arranged, the method including:

a first step of preparing a laminated glass including an information acquisition region that is opposite to the information acquisition device and through which the light passes, the laminated glass being provided with a blocking layer that blocks a field of vision from the outside of the vehicle and is provided with an opening arranged to correspond to the information acquisition region;

a second step of attaching a sticky layer of an antifog sheet in which at least the sticky layer, a substrate film, and an antifog layer are layered in this order to at least a surface on a vehicle interior side of the information acquisition region; and a third step of fixing, around the opening, a bracket for opposing the information acquisition device to the information acquisition region such that at least a portion of the bracket is blocked by the blocking layer, wherein the laminated glass includes at least one glass plate in which surface concentrations of tin oxide in two principal surfaces are different, and a surface of the glass plate in which the concentration of tin oxide is higher faces the vehicle interior side.

Aspect 24 is the method for manufacturing a windshield according to aspect 23,
wherein the glass plate in which the surface concentrations of tin oxide in the two principal surfaces are different is made of float glass, and
a surface of the two principal surfaces of the float glass in which the concentration of tin oxide is higher is taken as a bottom surface, and a surface in which the concentration of tin oxide is lower is taken as a top surface.

Aspect 25 is the method for manufacturing a windshield according to aspect 23,
wherein the planar size of the antifog sheet is larger than the planar size of the opening of the blocking layer.

Aspect 26 is the method for manufacturing a windshield according to aspect 25,
wherein the bracket is formed in a frame shape, and
the planar size of the antifog sheet is smaller than the internal size of the bracket.

Aspect 27 is the method for manufacturing a windshield according to aspect 26,
wherein the planar size of the antifog sheet is smaller than the planar size of the opening of the blocking layer.

Aspect 28 is the method for manufacturing a windshield according to aspect 25,
wherein the planar size of the opening of the blocking layer is larger than the planar size of the information acquisition region, and
the planar size of the antifog sheet is larger than the planar size of the information acquisition region and smaller than the planar size of the opening of the blocking layer.

Aspect 29 is the method for manufacturing a windshield according to any one of aspects 23 to 28,
wherein, in the second step, the antifog sheet is layered on the surface on the vehicle interior side of the information acquisition region such that at least a portion of the edge of the antifog sheet comes into contact with the edge of the opening of the blocking layer.

Aspect 30 is the method for manufacturing a windshield according to aspect 29,
wherein an imaging device for taking images of the outside of the vehicle through the information acquisition region and a laser device for emitting and/or receiving a ray of light that serve as the information acquisition devices are lined up in a horizontal direction, and
a portion where the edge of the opening of the blocking layer and the edge of the antifog sheet are in contact with each other is arranged on the imaging device side.

Aspect 31 is the method for manufacturing a windshield according to any one of aspects 23 to 30,
wherein the total thickness of the equipment film and the antifog layer of the antifog sheet is larger than the thickness of the blocking layer.

Aspect 32 is the method for manufacturing a windshield according to aspect 31,
wherein the thickness of the substrate film of the antifog sheet is larger than the thickness of the blocking layer.

Aspect 33 is the method for manufacturing a windshield according to any one of aspects 23 to 32,
wherein the interlayer contains heat-ray absorbing particles, and
the particles are not arranged in a region of the interlayer that overlaps the blocking layer and the opening in a plan view, and are arranged in the other region.

Aspect 34 is the method for manufacturing a windshield according to any one of aspects 23 to 33,
wherein the antifog layer contains at least one type of polymer selected from the group consisting of urethane resin, epoxy resin, acrylic resin, polyvinyl acetal resin, and polyvinylalcohol resin, and
the polymer is contained in an amount of 50 mass % or more and 99 mass % or less.

Aspect 35 is the method for manufacturing a windshield according to any one of aspects 23 to 34,
wherein the antifog sheet is formed in a rectangular shape in a plan view, and
corner portions of the antifog sheet are rounded.

Aspect 36 is the method for manufacturing a windshield according to any one of aspects 23 to 35,
wherein the substrate film is made of a material having a thermal conductivity of $5 \times 10^{-4}$ cal/cm·sec·° C. or less.

Aspect 37 is the method for manufacturing a windshield according to any one of aspects 23 to 36,
wherein the antifog layer contains a surfactant.

Aspect 38 is the method for manufacturing a windshield according to any one of aspects 23 to 37,
wherein the antifog sheet is formed to have a trapezoidal cross section in which a side located on the antifog layer side is shorter than a side located on the substrate film side.

Aspect 39 is the method for manufacturing a windshield according to aspects 38,
wherein an imaging device for taking images of the outside of a vehicle through the information acquisition region and a laser device for emitting and/or receiving a ray of light that serve as the information acquisition devices are lined up in a horizontal direction, and
in the trapezoidal shape seen in the antifog sheet, a leg located on a side on which the laser device is arranged is inclined at a larger angle than an angle at a leg located on a side on which the imaging device is arranged is inclined.

Aspect 40 is the method for manufacturing a windshield according to any one of aspects 23 to 39,
wherein the substrate film includes a plurality of layers.

Incidentally, when the antifog sheet as described above is attached to a laminated glass, there is a risk that interference fringes are observed. That is, there is a risk that interference fringes are observed due to interference between reflected light, which is light from the outside reflected at the interface between the glass plate and the sticky layer, and reflected light, which is light from the outside reflected at the interface between the sticky layer and the substrate film. For example, commonly used float glass has a refractive index of 1.52, but its bottom surface has a refractive index of 1.54 to 1.59, which is higher than that value. An acrylic sticky layer and a substrate film made of polyethylene terephthalate have refractive indices of 1.47 and 1.60 respectively, and thus interference fringes as described above are observed due to the difference between these refractive indices. Accordingly, there is a risk that accurate irradiation of light from the information acquisition device cannot be performed or the information acquisition device cannot receive light accurately. As a result, a distance between vehicles or the like may be inaccurately calculated. It is an object of a second invention according to the present invention to provide a windshield capable of preventing interference fringes from being observed even when an antifog sheet is attached thereto, and a method for manufacturing the windshield.

A second windshield according to the present invention and a method for manufacturing the windshield are configured as follows.

The second windshield is a windshield for an automobile on which an information acquisition device configured to acquire information from the outside of a vehicle by emitting and/or receiving light can be arranged, the windshield including:
  a laminated glass including an information acquisition region that is opposite to the information acquisition device and through which the light passes; and
  an antifog sheet in which at least a sticky layer, a substrate film, and an antifog layer are layered in this order, the sticky layer being attached to at least a surface on a vehicle interior side of the information acquisition region,
  wherein the laminated glass includes at least one glass plate in which surface concentrations of tin oxide in two principal surfaces are different, and a surface of the glass plate in which the concentration of tin oxide is lower faces the vehicle interior side.

A method for manufacturing the second windshield is a method for manufacturing a windshield for an automobile on which an information acquisition device configured to acquire information from the outside of a vehicle by emitting and/or receiving light can be arranged, the method including:
  a first step of preparing a laminated glass including an information acquisition region that is opposite to the information acquisition device and through which the light passes, the laminated glass being provided with a blocking layer that blocks a field of vision from the outside of the vehicle and is provided with an opening arranged to correspond to the information acquisition region;
  a second step of attaching a sticky layer of an antifog sheet in which at least the sticky layer, a substrate film, and an antifog layer are layered in this order to at least a surface on a vehicle interior side of the information acquisition region; and
  a third step of fixing, around the opening, a bracket for opposing the information acquisition device to the information acquisition region such that at least a portion of the bracket is blocked by the blocking layer,
  wherein the laminated glass includes at least one glass plate in which surface concentrations of tin oxide in two principal surfaces are different, and a surface of the glass plate in which the concentration of tin oxide is lower faces the vehicle interior side.

With the above-described second invention, the refractive index of the top surface of the float glass is smaller than the refractive index of the bottom surface, and therefore, bringing the sticky layer into contact with the top surface makes it possible to reduce the difference in refractive index between the float glass and the sticky layer. For example, the difference in refractive index between the above-described acrylic sticky layer and the bottom surface of common glass is 0.07 to 0.12, but bringing the sticky layer into contact with the top surface makes it possible to make the difference in refractive index smaller than 0.06. As a result, it is possible to reduce the interference fringes.

Advantageous Effects of the Invention

With the present invention, in a windshield to which an information acquisition device that emits and/or receives light can be attached, light can be accurately emitted and/or received and information can be accurately processed.

BRIEF DESCRIPTION OF DRAWINGS

FIG. 9D schematically shows the example of the manufacturing process of the windshield according to the embodiment.

FIG. 18 shows photographs showing an example and a comparative example.

DESCRIPTION OF EMBODIMENTS

Hereinafter, an embodiment (also referred to as "this embodiment" hereinafter) according to an aspect of the present invention will be described with reference to the drawings. However, this embodiment described below is merely an example of the present invention in all respects. It goes without saying that various improvements and modifications can be performed without departing from the scope of the present invention. In other words, in the implementation of the present invention, the specific configuration corresponding to the embodiment may be employed as appropriate. It should be noted that, in the following description, the orientations in the diagrams are used as standards for the sake of convenience.

§ 1 Configuration Example

Figure 1:
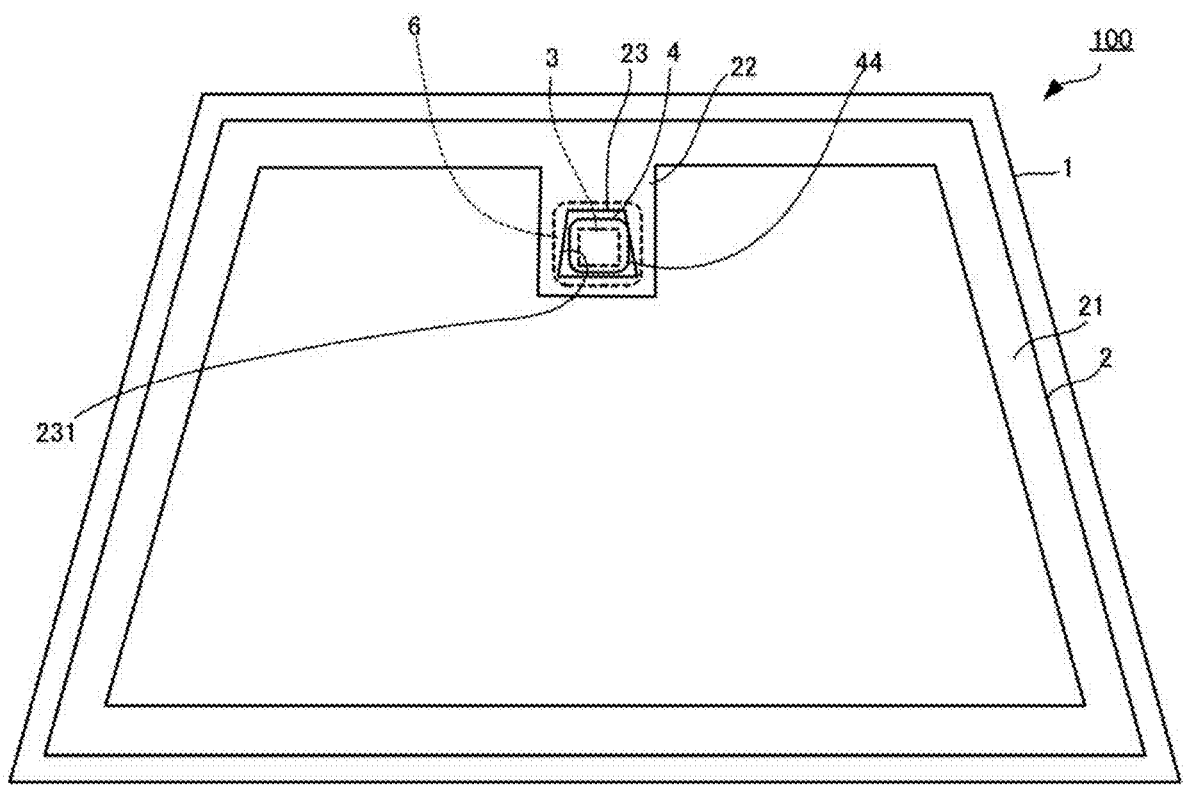
FIG. 1 is a schematic front view showing an example of a windshield according to an embodiment.
Figure 2:
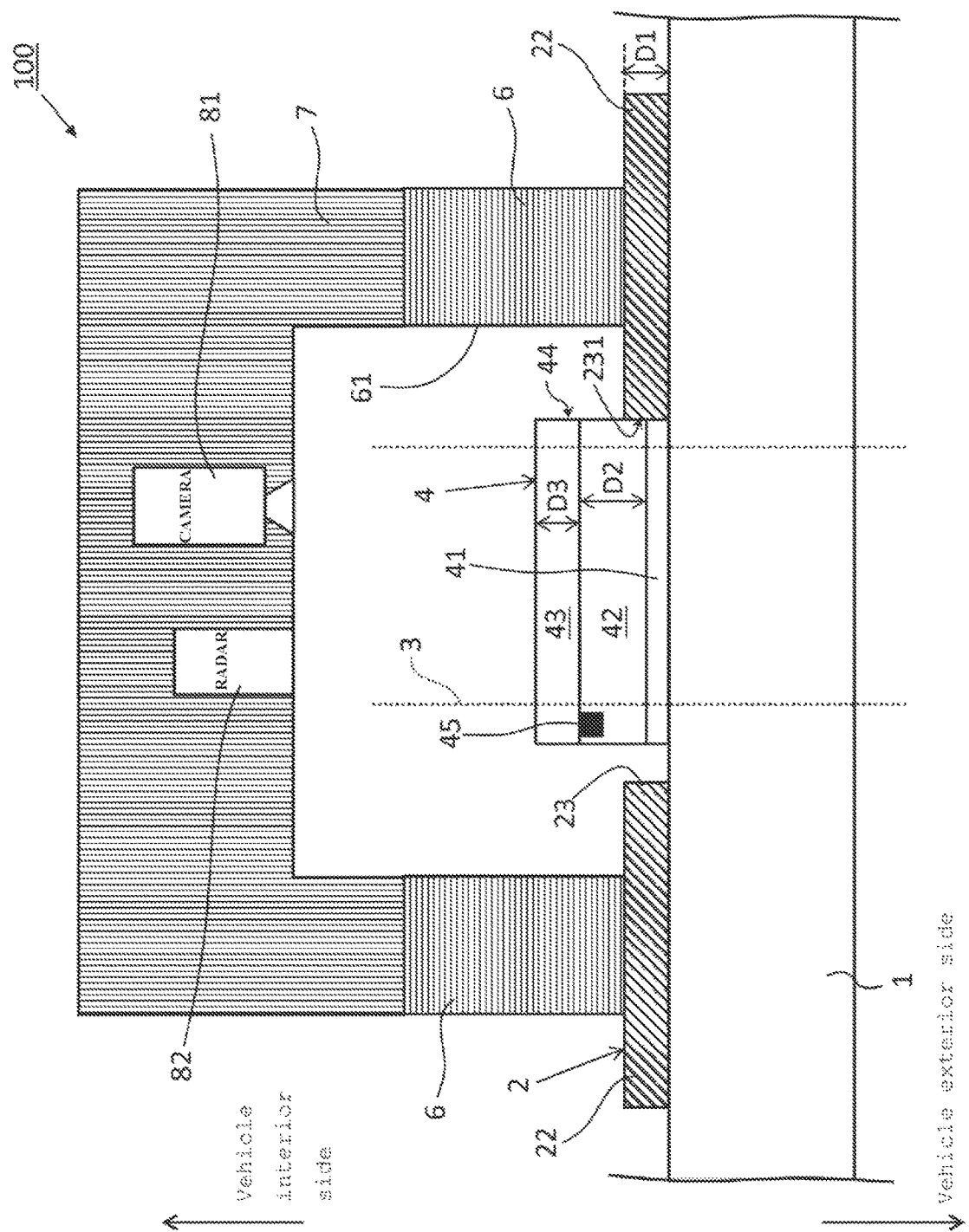
FIG. 2 is a schematic partial cross-sectional view showing an example of the vicinity of an information acquisition region of the windshield according to the embodiment.

First, a windshield 100 according to this embodiment will be described with reference to FIGS. 1 and 2. FIG. 1 is a schematic front view showing an example of the windshield 100 according to this embodiment. FIG. 2 is a schematic partial cross-sectional view showing an example of the vicinity of an information acquisition region 3 of the windshield according to this embodiment.

As shown in the examples in FIGS. 1 and 2, the windshield 100 according to this embodiment includes a laminated glass 1, and a blocking layer 2 that is made of a dark-colored ceramic and blocks a field of vision from the outside of a vehicle. The blocking layer 2 is provided along the peripheral edge portion of the laminated glass 1, and includes a peripheral edge portion 21 having a ring shape and a protruding portion 22 protruding inward in the in-plane direction from the center of the upper side of the peripheral edge portion 21.

An opening 23 where ceramic is not layered is provided in the protruding portion 22, and a frame-shaped bracket 6 is fixed around the opening 23. A cover 7 for mounting an information acquisition device that acquires information from the outside of a vehicle by emitting and/or receiving light can be attached to the bracket 6. Accordingly, the windshield 100 is configured such that an information acquisition device can be arranged inside a vehicle.

In this embodiment, a camera 81 and a radar 82, which are examples of the information acquisition devices, are attached inside a vehicle. The camera 81 corresponds to the "imaging device" of the present invention. The radar 82 corresponds to the "laser device" of the present invention. When the camera 81 and the radar 82 are attached inside the vehicle, the information acquisition region 3 through which light passes is set at a position on the laminated glass 1 that is opposite to the camera 81 and the radar 82, that is, in the opening 23. The camera 81 and the radar 82 acquire information about the outside of the vehicle through this information acquisition region 3.

An antifog sheet 4 is layered on (attached to) a surface on the vehicle interior side of the information acquisition region 3. The antifog sheet 4 corresponds to the "antifog laminate" of the present invention. The antifog sheet 4 includes an antifog layer 43 having antifog properties and a substrate film 42 that blocks the dissipation of heat from the inside of the vehicle to the outside of the vehicle. The antifog layer 43 is arranged as the outermost layer, and the substrate film 42 is arranged between the antifog layer 43 and the laminated glass 1 (information acquisition region 3). In this embodiment, this makes it less likely that the temperature near the information acquisition region 3 decreases, thus making it possible to suppress impairment of the antifog function in the information acquisition region 3. Hereinafter, constituent elements will be described.

Laminated Glass

Figure 3:
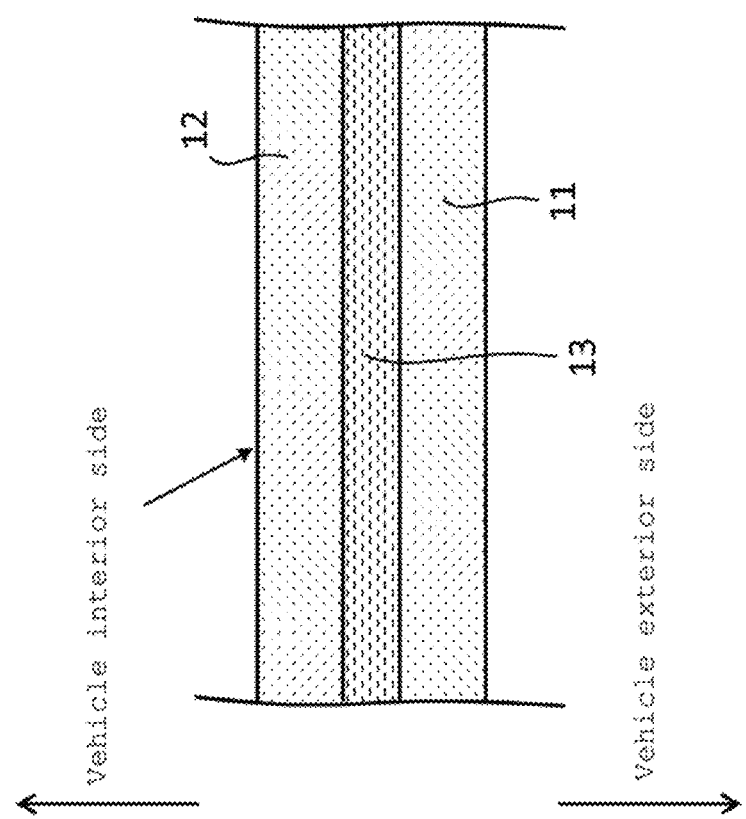
FIG. 3 is a schematic cross-sectional view showing an example of a glass plate according to the embodiment.

First, the laminated glass 1 will be described also referring to FIG. 3. FIG. 3 is a schematic cross-sectional view showing an example of the laminated glass 1 according to this embodiment. As shown in FIG. 3, the laminated glass 1 includes an outer glass plate 11 arranged on the vehicle exterior side, and an inner glass plate 12 arranged on the vehicle interior side. An interlayer 13 is arranged between the outer glass plate 11 and the inner glass plate 12, and the surface on the vehicle interior side of the outer glass plate 11 and the surface on the vehicle exterior side of the inner glass plate 12 are joined together via this interlayer 13.

Outer Glass Plate and Inner Glass Plate

The glass plates (11, 12) have substantially the same shape, and their shape is trapezoidal in a plan view. The glass plates (11, 12) may curve in a direction orthogonal to the surface or be flat in shape. For example, the glass plates (11, 12) may curve such that the surface on the vehicle exterior side is convex and the surface on the vehicle interior side is concave.

Known glass plates can be used as the glass plates (11, 12). The glass plates (11, 12) may be made of heat-ray absorbing glass, clear glass, green glass, UV green glass, or the like, which are a type of float glass, for example. It should be noted that the glass plates (11, 12) are configured such that visible light transmittance that conforms to the safety standards of the country in which the automobile is to be used is attained. For example, the glass plates (11, 12) may be configured such that the transmittance of visible light (380 nm to 780 nm) is 70% or more, as defined in JIS R 3211. It should be noted that this transmittance can be measured, as defined in JIS R 3212 (3.11 Visible light transmittance test), using a spectrometric method defined in JIS Z 8722. Moreover, adjustments can also be made so that the outer glass plate 11 ensures a desired solar absorptance and the inner glass plate 12 provides visible light transmittance that meets safety standards, for example. An example of the composition of clear glass and an example of the composition of heat-ray absorbing glass are shown below as an example of the composition of glass that can be used to form the glass plates (11, 12).

Clear Glass $SiO_2$: 70 to 73 mass %

$Al_2O_3$: 0.6 to 2.4 mass %

CaO: 7 to 12 mass %

MgO: 1.0 to 4.5 mass %

$R_2O$: 13 to 15 mass % (R is an alkali metal)

Total iron oxide (T-$Fe_2O_3$) in terms of $Fe_2O_3$: 0.08 to 0.14 mass %

Heat-Ray Absorbing Glass

With regard to the composition of heat-ray absorbing glass, a composition obtained, which is based on the composition of clear glass, by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass % and reducing the components (mainly $SiO_2$ and $Al_2O_3$) forming the framework of glass by an amount corresponding to the increases in T-$Fe_2O_3$, $CeO_2$, and $TiO_2$ can be used, for example.

Although there is no particular limitation on the thickness of the laminated glass 1 according to this embodiment, the total thickness of the glass plates (11, 12) is preferably set to 2.5 mm to 10.6 mm, more preferably 2.6 mm to 3.8 mm, and even more preferably 2.7 mm to 3.2 mm, from the viewpoint of weight reduction. As described above, it is sufficient that the total thickness of the glass plates (11, 12) is reduced in order to reduce the weight. Although there is no particular limitation on the thicknesses of the glass plates (11, 12), the thicknesses of the glass plates (11, 12) can be determined as described below, for example.

In other words, the outer glass plate 11 mainly requires durability and impact resistance against impact with flying objects such as small stones, and the like. On the other hand, the weight increases as the thickness of the outer glass plate 11 increases, which is not preferable. From this viewpoint, the thickness of the outer glass plate 11 is preferably 1.6 mm to 2.5 mm, and more preferably 1.9 mm to 2.1 mm. It is possible to determine which thickness to employ as appropriate according to the embodiment.

On the other hand, the thickness of the inner glass plate 12 can be made equal to the thickness of the outer glass plate 11, but in order to reduce the weight of the laminated glass 1, for example, the thickness can be made smaller than that of the outer glass plate 11. Specifically, when the strength of the glass is taken into consideration, the thickness of the inner glass plate 12 is preferably 0.6 mm to 2.1 mm, more preferably 0.8 mm to 1.6 mm, and even more preferably 1.0 mm to 1.4 mm. Furthermore, the thickness of the inner glass plate 12 is preferably 0.8 mm to 1.3 mm. For the inner glass plate 12 as well, it is possible to determine which thickness to employ as appropriate according to the embodiment.

Interlayer

The interlayer 13 is sandwiched between the glass plates (11, 12) and joins the glass plates (11, 12) together. The interlayer 13 can be variously configured according to the embodiment. For example, a configuration is possible in which the interlayer 13 is constituted by three layers, namely a soft core layer and two outer layers that are harder than the core layer and between which the core layer is sandwiched. The damage resistance and noise blocking of the laminated glass 1 can be enhanced by forming the interlayer 13 with multiple layers including soft layers and hard layers as described above.

Also, the material of the interlayer 13 need not be particularly limited, and may be selected from resin materials, for example, as appropriate according to the embodiment. For example, if the interlayer 13 is formed with multiple layers having different hardnesses as described above, it is possible to use polyvinyl butyral resin (PVB) for the hard outer layers. The polyvinyl butyral resin (PVB) is preferable as the material of the outer layers because it has excellent adhesiveness with the outer glass plate 11 and the inner glass plate 12 and excellent penetration resistance. Moreover, ethylene vinyl acetate resin (EVA) or polyvinyl acetal resin that is softer than the polyvinyl butyral resin used for the outer layers can be used for the soft core layer.

It should be noted that, in general, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer added, and the like. Accordingly, a hard polyvinyl acetal resin that is used for the outer layers and a soft polyvinyl acetal resin that is used for the core layer may be produced by appropriately adjusting at least one of the conditions of (a) to (d).

Furthermore, the hardness of a polyvinyl acetal resin can be controlled based on the type of aldehyde that is used for acetalization and whether co-acetalization using a plurality of kinds of aldehydes or pure acetalization using a single kind of aldehyde is performed. Although not necessarily applicable to every case, the larger the number of carbon atoms of the aldehyde that is used to obtain a polyvinyl acetal resin is, the softer the resulting polyvinyl acetal resin tends to be. Accordingly, if the outer layers are made of a polyvinyl butyral resin, for example, a polyvinyl acetal resin that is obtained by acetalizing an aldehyde having 5 or more carbon atoms (e.g., n-hexyl aldehyde, 2-ethylbutyl aldehyde, n-heptyl aldehyde, or n-octyl aldehyde) with polyvinyl alcohol can be used for the core layer.

Moreover, the total thickness of the interlayer 13 can be set as appropriate according to the embodiment. For example, the total thickness of the interlayer 13 can be set to 0.3 to 6.0 mm, preferably 0.5 to 4.0 mm, and more preferably 0.6 to 2.0 mm. If the interlayer 13 is constituted by a three-layer structure including a core layer and two outer layers between which the core layer is sandwiched, the thickness of the core layer is preferably 0.1 to 2.0 mm, and more preferably 0.1 to 0.6 mm. On the other hand, the thickness of each outer layer is preferably larger than the thickness of the core layer, and specifically, is preferably 0.1 to 2.0 mm, and more preferably 0.1 to 1.0 mm.

Although there is no particular limitation on the method for manufacturing such an interlayer 13, examples of the manufacturing method include a method in which a resin component such as the above-described polyvinyl acetal resin, a plasticizer, and other additives, if necessary, are mixed and uniformly kneaded, and then the layers are collectively extruded, and a method in which two or more resin films that are produced using this method are laminated through a pressing process, a lamination process, or the like. In the method of laminating through the pressing process, the lamination process, or the like, each of the resin films before laminating may have a single-layer structure or a multilayer structure. Moreover, the interlayer 13 may include a single layer instead of the plurality of layers as described above.

Orientation of Glass Plate

In this embodiment, both the outer glass plate 11 and the inner glass plate 12 are constituted by float glass manufactured through a float method. In general, glass plates manufactured through the float method are called float glass, and float glass plates are well known as glass plates in which the concentrations of tin oxide in its two principal surfaces are different due to the manufacturing method. Specifically, in the float method, a glass plate having a flat shape is manufactured by flowing molten glass onto the surface of molten tin. At this time, a tin oxide-containing layer is present on a surface of the glass plate that was in contact with the molten tin. In general, a surface of the glass plate in which this tin oxide-containing layer is present is referred to as a "bottom surface", and a surface on the opposite side that was not in contact with tin is referred to as a "top surface". As described later, the content of tin oxide in the bottom surface is larger than the content of tin oxide in the top surface. Here, the content of tin oxide is the maximum concentration of tin oxide in terms of tin dioxide within a range of 10 μm deep from the glass surface. Specifically, the content of tin oxide can be specified based on a value measured using a wavelength dispersive X-ray detector (WDX) provided in an electron probe micro analyzer (EPMA), for example. The content of tin oxide in the bottom surface is preferably 1 to 10 mass %, and the content of tin oxide in the top surface is preferably 1% or less and more preferably 0.3% or less.

In this embodiment, the bottom surface of the inner glass plate 12 faces the vehicle interior side. On the other hand, the orientation of the outer glass plate 11 is not limited, and the bottom surface or the top surface may face the vehicle interior side, that is, may be in contact with the interlayer 13.

Blocking Layer

Figure 4:
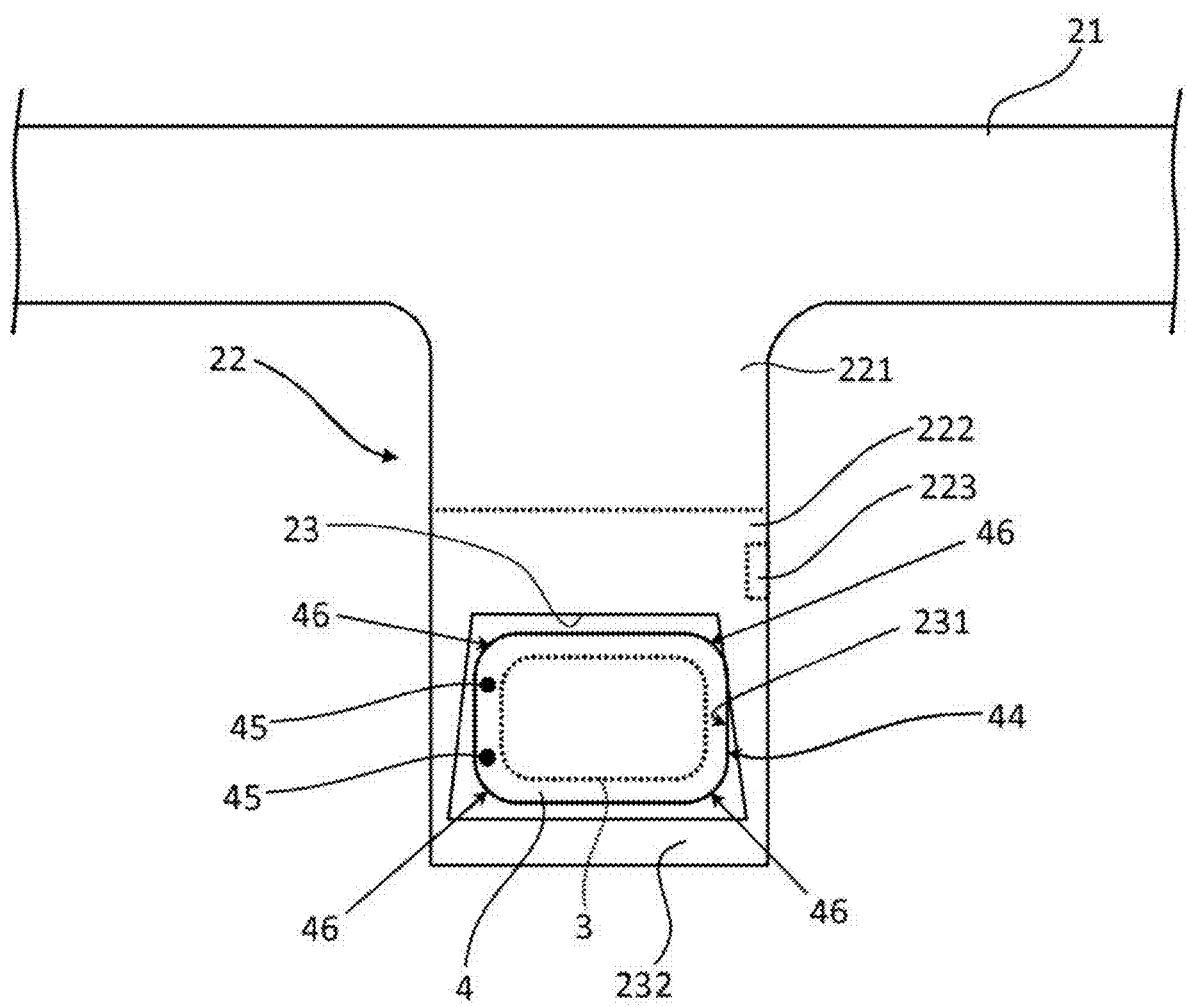
FIG. 4 is a schematic partially enlarged view showing an example of the vicinity of the information acquisition region of the windshield according to the embodiment.
Figure 5:
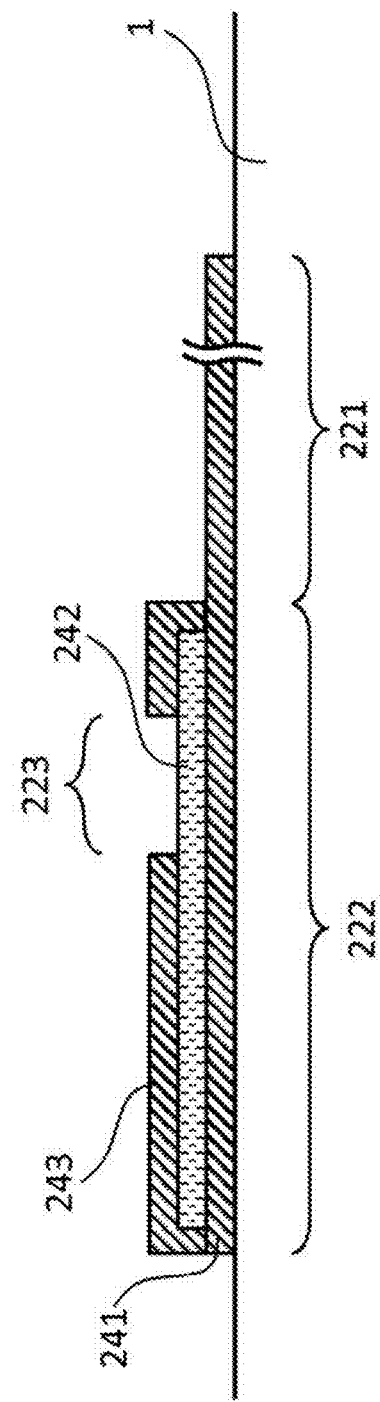
FIG. 5 is a schematic cross-sectional view showing an example of a blocking layer according to the embodiment.

Next, the blocking layer 2 for blocking a field of vision from the outside of a vehicle will be described also referring to FIGS. 4 and 5. FIG. 4 is a schematic partially enlarged view showing an example of the vicinity of the information acquisition region 3 of the windshield 100 according to this embodiment. FIG. 5 is a schematic cross-sectional view showing an example of the blocking layer 2 according to this embodiment.

As shown in FIGS. 2 and 5, the blocking layer 2 is provided on the surface on the vehicle interior side of the laminated glass 1, that is, the surface on the vehicle interior side of the inner glass plate 12. The blocking layer 2 includes the peripheral edge portion 21 that is layered in a ring shape along the peripheral edge portion of the surface on the vehicle interior side of the laminated glass 1, and a protruding portion 22 that has a substantially rectangular shape and protrudes inward in the in-plane direction from the center of the upper side of the peripheral edge portion 21.

The opening 23 arranged to correspond to the information acquisition region 3 is provided in the protruding portion 22. As shown in FIGS. 1 and 4, the opening 23 is formed in a substantially rectangular shape, and a region 232 on the lower side is open. The planar size of the opening 23 is set to be larger than the planar size of the information acquisition region 3.

The dimensions of the portions of the blocking layer 2 can be set as appropriate according to the embodiment. For example, in the peripheral edge portion 21, the widths of the portions that extend along the upper end side and the lower end side of the laminated glass 1 may be set to be in a range of 20 mm to 100 mm, and the widths of the portions that extend along the left end side and the right end side of the laminated glass 1 may be set to be in a range of 15 mm to 70 mm. In addition, the size of the protruding portion 22 is set to be in a range of 200 mm (vertical)×100 mm (horizontal) to 400 mm (vertical)×200 mm (horizontal).

Moreover, the planar size of the information acquisition region 3 is determined depending on the information acquisition device installed inside the vehicle. By contrast, the planar size of the opening 23 may be set as appropriate so as to be larger than the planar size of the information acquisition region 3. For example, the opening 23 may be set as a trapezoidal region with an upper side of 85 mm, a lower side of 95 mm, and a height of 65 mm in a plan view.

The opening 23 is a region where the dark-colored ceramic constituting the blocking layer 2 is not layered. In other words, the dark-colored ceramic is not layered in this opening 23 and a region on the inner side in the in-plane direction with respect to the peripheral edge portion 21, and light can pass therethrough. As shown in FIG. 2, the camera 81 and the radar 82 arranged on the vehicle interior side with respect to the laminated glass 1 acquire information about the outside of the vehicle through the information acquisition region 3 within the opening 23. Therefore, the information acquisition region 3 may be configured such that the visible light transmittance is 70% or more, as defined in JIS R 3211 as described above, for example.

Similarly, the dark-colored ceramic is also not layered in the region on the inner side in the in-plane direction with respect to the peripheral edge portion 21, and light can pass therethrough. Passengers seated in the driver's seat and the passenger's seat in the automobile to which the windshield 100 is attached view the frontward vehicle exterior through the region on the inner side in the in-plane direction with respect to the peripheral edge portion 21. For this reason, the region on the inner side in the in-plane direction with respect to the peripheral edge portion 21 is configured to have visible light transmittance of an amount with which at least the traffic conditions of the vehicle exterior are visible.

In this embodiment, as shown in FIG. 4, the protruding portion 22 is constituted by an upper region 221 that is arranged on the upper side with respect to the opening 23, a lower region 222 that is located on the lower side with respect to the upper region 221 and in which the opening 23 is formed, and a rectangular lateral region 223 that is formed in a lateral portion of the lower region 222. The protruding portion 22 has a layered structure as shown in FIG. 5.

That is, the upper region 221 is constituted by a single layer, namely a first ceramic layer 241 made of a dark-colored ceramic. The lower region 222 is constituted by three layers that are layered on the inner surface of the laminated glass 1, namely the above-described first ceramic layer 241, a silver layer 242, and a second ceramic layer 243. The silver layer 242 is made of silver, and the second ceramic layer 243 is made of the same material as the material of the first ceramic layer 241.

The lateral region 223 is constituted by the first ceramic layer 241 and the silver layer 242, which are layered on the inner surface of the laminated glass 1, and the silver layer 242 is exposed to the vehicle interior side. The first ceramic layer 241, which is the undermost layer, is shared by all of the regions, and the silver layer 242, which is the second layer, is shared by the lower region 222 and the lateral region 223.

It should be noted that, as described later, a bracket to which the cover for the camera 81 and the radar 82 is to be attached is bonded, using an adhesive, to the protruding portion 22 formed on the surface on the vehicle interior side of the inner glass plate 12. If a urethane-silicone-based adhesive is used for this purpose, for example, there is a risk that the adhesive may deteriorate due to ultraviolet rays or the like. Therefore, it is preferable that the thicknesses of the ceramic layers (241, 243) are set to 20 µm to 50 µm, for example, from the viewpoint of ensuring light blocking properties and preventing the deterioration of the adhesive. Moreover, it is preferable that the thickness of the silver layer 242 is set to 20 µm to 50 µm, for example. Therefore, it is preferable that the thickness D1 of the lower region 222 of the protruding portion 22 is set to 60 µm to 150 µm, for example.

The blocking layer 2 including the peripheral edge portion 21 and the protruding portion 22 as described above can be formed as described below, for example. First, the first ceramic layer 241 is applied to the glass plate. The first ceramic layer 241 is shared by the peripheral edge portion 21 and the protruding portion 22. Next, the silver layer 242 is applied to the regions corresponding to the lower region 222 and the lateral region 223 on the first ceramic layer 241. Lastly, the second ceramic layer 243 is applied to the region corresponding to the lower region 222 on the silver layer 242.

It should be noted that the silver layer 242, which is exposed in the lateral region 223, is provided with wiring for grounding. Although the ceramic layers (241, 243) and the silver layer 242 can be formed using a screen printing process, these layers can also be produced, in addition, by transferring a transfer film for firing to the glass plate and firing it. Configuring the lower region 222 in this manner such that the silver layer 242 is included makes it possible to block electromagnetic waves and thereby prevent the camera 81 and the radar 82, which are attached via the bracket 6 fixed to the lower region 222, from being affected by electromagnetic waves.

Materials of the ceramic layers (241, 243) may be selected as appropriate according to the embodiment. The ceramic layers (241, 243) can be made of ceramic with a dark color such as black, brown, gray, or dark blue, for example. Specifically, the ceramic layers (241, 243) can be made of ceramic having a composition shown in Table 1 below. However, the composition of the ceramic constituting the ceramic layers (241, 243) is not limited to that shown in Table 1 below, and may be selected as appropriate according to the embodiment.

TABLE 1

|  |  | Ceramic paste |
| --- | --- | --- |
| Pigment *1 | mass % | 10% |
| Resin (cellulose resin) | mass % | 5% |
| Organic solvent (pine oil) | mass % | 15% |
| Glass binder *2 | mass % | 70% |
| Viscosity | dPs | 150 |

*1: Black 6350 (Pigment Green 17) manufactured by Asahi Kasei Kogyo Co., Ltd.
*2: Main components: bismuth borosilicate, zinc borosilicate Moreover, a material of the silver layer 242 may also be selected as appropriate according to the embodiment. The material having a composition shown in Table 2 below can be used for the silver layer 242, for example.

TABLE 2

|  |  | Conductive ceramic paste |
| --- | --- | --- |
| Silver particles (average particle diameter: 10 µm) | mass % | 70 |
| Glass binder *1 | mass % | 10 |
| Resin (cellulose resin) | mass % | 5 |
| Organic medium (terpineol) | mass % | 15 |
| Viscosity | dPs | 180 |

*1: Main components: bismuth borosilicate, zinc borosilicate

The screen printing can be performed under the conditions that a polyester screen of 355 mesh is used, the coating thickness is 20 µm, the tension is 20 Nm, the squeegee hardness is 80 degrees, the attachment angle is 75°, and the printing speed is 300 mm/s, for example, and the ceramic layers (241, 243) and the silver layer 242 can be formed by performing drying in a drying furnace at 150° C. for 10 minutes. It should be noted that when the first ceramic layer 241, the silver layer 242, and the second ceramic layer 243 are layered in this order, it is sufficient that the above-described screen printing and drying are repeated.

Antifog Sheet

Next, the antifog sheet 4 will be described. As shown in FIG. 2, the antifog sheet 4 is formed with a rectangular cross section and includes a transparent sheet-like substrate film 42, a transparent antifog layer 43 layered on one surface of the substrate film 42, and a transparent sticky layer 41 layered on the other surface of the substrate film 42. The antifog sheet 4 is attached to the surface on the vehicle interior side of the information acquisition region 3, namely the surface on the vehicle interior side of the inner glass plate 12, via the sticky layer 41 with the other surface of the substrate film 42 facing that surface. Hereinafter, the layers will be described.

(A) Antifog Layer

First, the antifog layer 43 will be described. The antifog layer 43 is arranged as the outermost layer of the antifog sheet 4 and exhibits the antifog function. The type of antifog layer 43 need not be particularly limited as long as it is transparent and has antifog properties, and known antifog layers can be used. In general, the types of antifog layer include a hydrophilic type that turns water generated from water vapor into a water layer on its surface, a water absorbent type that absorbs water vapor, and a water repellent type that repels waterdrops produced by water vapor. All these types can be used as the antifog layer 43.

When the water absorbent type is employed, the antifog layer 43 can be configured as described below, for example. That is, the antifog layer 43 can be configured to include a water repellent group and a metallic oxide component, and to preferably further include a water absorbent resin. The antifog layer 43 may further include other functional components as needed. There is no limitation on the type of water absorbent resin as long as a resin that can absorb and hold water is used. The antifog layer 43 can be supplied with a water repellent group using a metallic compound containing a water repellent group (water repellent group-containing metallic compound). The antifog layer 43 can be supplied with a metallic oxide component using a metallic compound other than the water repellent group-containing metallic compound, minute particles of a metallic oxide, or the like. Hereinafter, these components will be described.

Water Absorbent Resin

First, the water absorbent resin will be described. The antifog layer 43 can contain, as the water absorbent resin, at least one type of polymer selected from the group consisting of urethane resin, epoxy resin, acrylic resin, polyvinyl acetal resin, and polyvinylalcohol resin. An example of the urethane resin is polyurethane resin constituted by polyisocyanate and polyol. Acrylic polyol and polyoxyalkylene-based polyol are preferable as the polyol. Examples of the epoxy resin include glycidyl ether-based epoxy resin, glycidyl ester-based epoxy resin, glycidyl amine-based epoxy resin, and cyclic aliphatic epoxy resin. The cyclic aliphatic epoxy resin is preferable. Hereinafter, the polyvinyl acetal resin (referred to merely as "polyacetal" hereinafter), which is a preferable water absorbent resin, will be described.

Polyvinyl acetal can be obtained by acetalizing an aldehyde with polyvinyl alcohol through a condensation reaction. It is sufficient that the acetalization using polyvinyl alcohol is performed using a known method such as a precipitation method in which an aqueous medium is used in the presence of an acid catalyst, or a dissolution method in which a solvent such as alcohol is used. The acetalization can be performed in parallel with the saponification of polyvinyl acetate. The degree of acetalization is preferably 2 to 40 mol %, more preferably 3 to 30 mol %, and even more preferably 5 to 20 mol %, and optionally 5 to 15 mol %. The degree of acetalization can be measured based on $^{13}C$ nuclear magnetic resonance spectroscopy, for example. Polyvinyl acetal whose degree of acetalization is within the above-described range is suitable for forming an antifog layer having favorable water absorbing properties and water resistance.

The average degree of polymerization of the polyvinyl alcohol is preferably 200 to 4500, and more preferably 500 to 4500. A high average degree of polymerization is advantageous in the formation of an antifog layer having favorable water absorbing properties and water resistance, but if the average degree of polymerization is excessively high, the viscosity of the solution will become excessively high, and the formation of an antifog layer may be negatively affected. A favorable degree of saponification of the polyvinyl alcohol is 75 to 99.8 mol %.

Examples of the aldehyde to be condensed with polyvinyl alcohol through a condensation reaction include aliphatic aldehydes such as formaldehyde, acetaldehyde, butyraldehyde, hexylcarbaldehyde, octylcarbaldehyde, and decylcarbaldehyde. Examples thereof also include aromatic aldehydes including benzaldehyde; benzaldehyde subjected to substitution using an alkyl group such as 2-methylbenzaldehyde, 3-methylbenzaldehyde, 4-methylbenzaldehyde, or the like; benzaldehyde subjected to substitution using a halogen atom such as chlorobenzaldehyde or the like; substituted benzaldehyde in which a hydrogen atom is substituted with a functional group such as a hydroxy group, an alkoxy group, an amino group, or a cyano group, other than alkyl groups; and condensed aromatic aldehyde such as naphtaldehyde or anthraldehyde. Aromatic aldehydes, which are highly hydrophobic, are advantageous in the formation of an antifog layer with a low degree of acetalization and excellent water resistance. Use of aromatic aldehydes is also advantageous in that an antifog layer having high water absorbency is formed while a large number of hydroxy groups are caused to remain. It is preferable that the polyvinyl acetal has an acetal structure derived from an aromatic aldehyde, particularly benzaldehyde.

The content of the water absorbent resin (polymer) in the antifog layer 43 is preferably 50 mass % or more, more preferably 60 mass % or more, and even more preferably 65 mass % or more, and preferably 99 mass % or less, more preferably 90 mass % or less, and even more preferably 85 mass % or less, from the viewpoint of hardness, water absorbing properties, and antifog properties. This makes it possible to make it relatively likely that the antifog layer 43 thermally expands compared with a case where only hydrophilic inorganic materials are used. Accordingly, even if the substrate film 42 is made of a material such as polyethylene or polyethylene terephthalate that is likely to thermally expand, it is possible to allow the antifog layer 43 to follow the thermally expanding substrate film 42, and therefore, it is possible to make it less likely that the antifog sheet 4 will peel away from the information acquisition region 3. It should be noted that using a polymer as the main component as described above may make the antifog layer 43 relatively soft. For example, there is a possibility that the pencil hardness of the antifog layer 43 will be 2H or less.

Water Repellent Group

Next, the water repellent group will be described. The water repellent group facilitates the realization of both strength and antifog properties of the antifog layer, and contributes to ensuring the straightness of incident light even if waterdrops are formed due to the hydrophobic surface of the antifog layer. It is preferable to use a water repellent group with high water repellency in order to sufficiently obtain the effect of the water repellent group. For example, the antifog layer 43 can contain at least one type of water repellent group selected from (1) chain or cyclic alkyl groups having 3 to 30 carbon atoms and (2) chain or cyclic alkyl groups having 1 to 30 carbon atoms in which at least a portion of hydrogen atoms are substituted with a fluorine atom (also referred to as "fluorine-substituted alkyl groups" hereinafter).

The chain or cyclic alkyl groups in (1) and (2) are preferably chain alkyl groups. The chain alkyl groups may be branched alkyl groups, but are preferably linear alkyl groups. Alkyl groups having more than 30 carbon atoms may lead to the antifog layer being opaque. The number of carbon atoms in the chain alkyl groups is preferably 20 or less from the viewpoint of the balance between the antifog properties, strength, and external appearance of the antifog layer. The chain alkyl groups have 1 to 8 or 4 to 16 carbon atoms, for example, and have preferably 4 to 8 carbon atoms. Particularly preferable alkyl groups are linear alkyl groups having 4 to 8 carbon atoms such as an n-pentyl group, an n-hexyl group, an n-heptyl group, and an n-octyl group. The fluorine-substituted alkyl groups in (2) may be groups obtained by substituting only a portion of hydrogen atoms of a chain or a cyclic alkyl group with a fluorine atom, or groups obtained by substituting all of the hydrogen atoms of a chain or a cyclic alkyl group with a fluorine atom, such as linear perfluoroalkyl groups. The fluorine-substituted alkyl groups have high water repellency, and therefore, the effects can be sufficiently obtained by adding a small amount thereof. It should be noted that, when the content of the fluorine-substituted alkyl groups is excessively large, a component containing the fluorine-substituted alkyl groups may be separated from the other components in a coating solution for forming an antifog layer.

Hydrolyzable Metallic Compound Containing Water Repellent Group

In order to blend the water repellent groups into the antifog layer 43, it is sufficient that a metallic compound containing a water repellent group, particularly a metallic compound (water repellent group-containing hydrolyzable metallic compound) containing a water repellent group and a hydrolyzable functional group or a halogen atom, or a hydrolysate thereof is added to a coating solution for forming an antifog layer. In other words, the water repellent group may be derived from the water repellent group-containing hydrolyzable metallic compound. A water repellent group-containing hydrolyzable silicon compound represented by Formula (I) below is preferably used as the water repellent group-containing hydrolyzable metallic compound.

$$R_m SiY_{4-m} \tag{I}$$

Here, R represents a water repellent group, that is, a chain or cyclic alkyl group having 1 to 30 carbon atoms in which at least a portion of hydrogen atoms is optionally substituted with a fluorine atom, and Y represents a hydrolyzable functional group or a halogen atom, and m represents an integer of 1 to 3. The hydrolyzable functional group is at least one type selected from an alkoxyl group, an acetoxy group, an alkenyloxy group, and an amino group, and preferably an alkoxy group, particularly an alkoxy group having 1 to 4 carbon atoms. An example of the alkenyloxy group is an isopropenoxy group. The halogen atom is preferably a chlorine atom. It should be noted that the functional groups shown here as examples can also be used as "hydrolyzable functional groups" described hereinafter. m is preferably 1 or 2.

When the progress of hydrolysis and polycondensation is completed, the compound represented by Formula (I) supplies a component represented by Formula (II) below.

$$R_m SiO_{(4-m)/2} \tag{II}$$

Here, R and m are as described above. In practice, after the hydrolysis and polycondensation have been performed, the compounds represented by Formula (II) form a network structure in which silicon atoms are linked to one another via oxygen atoms, in the antifog layer.

As described above, the compounds represented by Formula (I) are hydrolyzed or partially hydrolyzed, and at least portions thereof are polycondensed. Thus, a network structure including siloxane bonds (Si—O—Si) is formed in which silicon atoms and oxygen atoms are alternately linked and that spreads three-dimensionally. A water repellent group R is linked to the silicon atom contained in this network structure. In other words, the water repellent group R is immobilized in the network structure including siloxane bonds via an R—Si bond. This structure is advantageous in uniform dispersion of the water repellent groups R in the antifog layer. The network structure may contain silica components supplied from silicon compounds (e.g., tetraalkoxysilane and silane coupling agents) other than the water repellent group-containing hydrolyzable silicon compound represented by Formula (I). If a silicon compound that does not contain a water repellent group and contains a hydrolyzable functional group or halogen atom (water repellent group-free hydrolyzable silicon compound) is blended together with the water repellent group-containing hydrolyzable silicon compound in a coating solution for forming an antifog layer, a network structure including siloxane bonds containing silicon atoms that are linked to water repellent groups and silicon atoms that are not linked to water repellent groups can be formed. With such a structure, it is easy to independently adjust the content of the water repellent group and the content of the metallic oxide component in the antifog layer.

When the antifog layer contains a water absorbent resin, the water vapor permeability of the surface of the antifog layer containing a water absorbent resin is enhanced due to the water repellent groups, and the antifog performance is thus enhanced. The two functions, namely the water absorbent function and the water repellent function, are contrary to each other, and therefore, conventionally, a water absorbent material and a water repellent material are distributed in separate layers. However, the maldistribution of water near the surface of the antifog layer is resolved due to the water repellent groups contained in the antifog layer, so that the time it takes until dew condenses is prolonged, and the antifog properties of the antifog layer are thus enhanced. The following is a description of the effects.

Water vapor that has infiltrated the antifog layer containing the water absorbent resin forms hydrogen bonds with hydroxy groups in the water absorbent resin and the like, and is retained in the form of bound water. As the amount of water vapor increases, the form of water vapor changes from bound water to semibound water, and finally, water vapor is retained in the form of free water retained in voids in the antifog layer. The water repellent groups prevent the formation of hydrogen bonds and facilitate the dissociation of formed hydrogen bonds in the antifog layer. If the content of the water absorbent resin is the same, the number of hydroxy groups capable of forming a hydrogen bond in the antifog layer is the same, but the speed of hydrogen bond formation is reduced due to the water repellent groups. Therefore, if the antifog layer containing the water repellent groups is used, moisture will ultimately be retained in any of the above-described forms in the antifog layer, but water vapor can diffuse to the bottom portion of the antifog layer as it is until it is retained therein. Moreover, water that is once retained dissociates relatively easily and is likely to move to the bottom portion of the antifog layer in the form of water vapor. As a result, the distribution of the retention amount of moisture in the thickness direction of the antifog layer is relatively uniform between the vicinity of the surface and the bottom portion of the antifog layer. That is, the entirety in the thickness direction of the antifog layer can be effectively used to absorb water supplied to the surface of the antifog layer, and therefore, waterdrops are less likely to be formed through condensation, thus resulting in the enhancement of antifog properties.

On the other hand, with a conventional antifog layer that does not contain the water repellent groups, water vapor that has infiltrated the antifog layer is retained significantly easily in the form of bound water, semibound water, or free water. Therefore, water vapor that has infiltrated the antifog layer tends to be retained in the vicinity of the surface of the antifog layer. As a result, in the antifog layer, the amount of moisture is extremely large in the vicinity of the surface, and rapidly decreases toward the bottom portion of the antifog layer. That is, although the bottom portion of the antifog layer can further absorb water, moisture saturates in the vicinity of the surface of the antifog layer and condenses into waterdrops, and therefore, the antifog properties are limited.

When the water repellent groups are introduced into the antifog layer using the water repellent group-containing hydrolyzable silicon compound (see Formula (I)), a network structure including stable siloxane bonds (Si—O—Si) is formed. The formation of this network structure is advantageous from the viewpoint of enhancing not only abrasion resistance but also hardness, water resistance, and the like.

It is sufficient that the water repellent groups are added in amounts at which the contact angle of water on the surface of the antifog layer is 70° or more, preferably 80° or more, and even more preferably 90° or more. A measurement value obtained by dropping a 4 mg drop of water onto the surface of the antifog layer is taken as the contact angle of water. In particular, when a methyl group or ethyl group, which has slightly low water repellency, is used as the water repellent group, it is preferable to blend, into the antifog layer, the water repellent groups in amounts at which the contact angle of water is within the above-described range. The upper limit of the contact angle of water is not particularly limited, but is 150° or less, 120° or less, or 105° or less, for example. It is preferable that the water repellent groups are uniformly contained in the antifog layer such that the contact angle of water is within the above-described range over the entire region of the surface of the antifog layer.

Figure 6A:
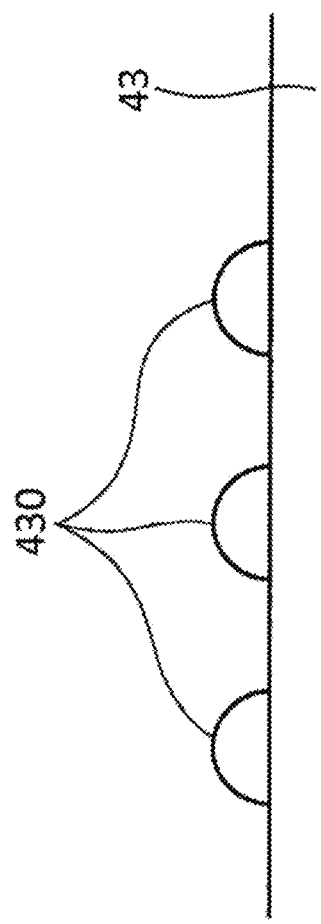
FIG. 6A shows an example of a state in which waterdrops are attached to an antifog layer.
Figure 6B:
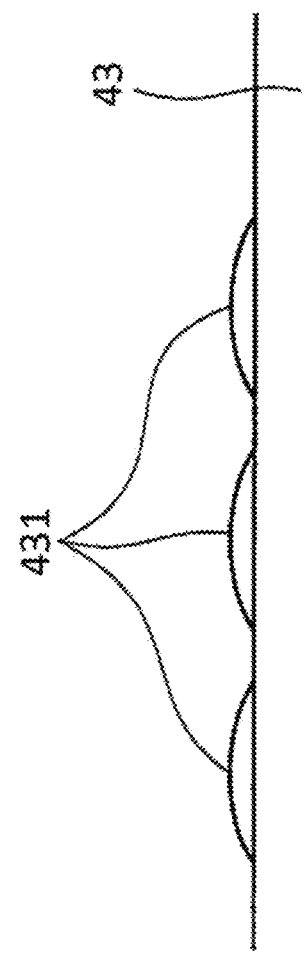
FIG. 6B shows an example of a state in which waterdrops are attached to the antifog layer.

Here, the relationship between the contact angle of water and the antifog layer 43 will be described with reference to FIGS. 6A and 6B. FIGS. 6A and 6B show states in which waterdrops (430, 431) that differ in contact angle attach to the antifog layers 43. As shown in FIGS. 6A and 6B, the areas of the antifog layer 43 covered with the waterdrops (430, 431) formed on the surface of the antifog layer 43 through condensation of the same amount of water vapor tend to decrease as the contact angle of water on the surface increases. The smaller the areas of the antifog layer 43 covered with the waterdrops (430, 431) are, the smaller the ratio of the areas in which light entering the antifog layer 43 diffuses is. Therefore, the antifog layer 43 in which the contact angle of water increases due to the presence of the water repellent groups is advantageous in that the straightness of transmitted light is maintained in a state in which waterdrops are formed on the surface of the antifog layer 43.

It is preferable that the antifog layer 43 contains the water repellent groups such that the contact angle of water is within the above-described preferable range. When the water absorbent resin is contained, it is preferable that the antifog layer 43 contains the water repellent groups such that the amount of water repellent groups is within a range of 0.05 parts by mass or more, preferably within a range of 0.1 parts by mass or more and more preferably within a range of 0.3 parts by mass or more, and within a range of 10 parts by mass or less and preferably within a range of 5 parts by mass or less, with respect to 100 parts by mass of the water absorbent resin.

Metallic Oxide Component

Next, the metallic oxide component will be described. The metallic oxide component is a component including an oxide of at least one type of element selected from Si, Ti, Zr, Ta, Nb, Nd, La, Ce, and Sn, for example, and is preferably a component including an oxide of Si (silica component). When the water absorbent resin is contained, it is preferable that the antifog layer 43 contains the metallic oxide component such that the amount of the metallic oxide component is preferably 0.01 parts by mass or more, preferably 0.1 parts by mass or more, more preferably 0.2 parts by mass or more, even more preferably 1 part by mass or more, even more preferably 5 parts by mass or more, optionally 7 parts by mass or more, and 10 parts by mass or more if necessary, with respect to 100 parts by mass of the water absorbent resin, and 60 parts by mass or less, particularly 50 parts by mass or less, preferably 40 parts by mass or less, more preferably 30 parts by mass or less, even more preferably 20 parts by mass or less, and optionally 18 parts by mass or less. The metallic oxide component is necessary for ensuring the strength of the antifog layer, particularly scratch resistance, but if the content of the metallic oxide component is excessively large, the antifog properties of the antifog layer are impaired.

At least a portion of the metallic oxide component may be derived from a hydrolyzable metallic compound or a hydrolysate thereof added to a coating solution for forming an antifog layer. Here, the hydrolyzable metallic compound is at least one selected from a) a metallic compound (water repellent group-containing hydrolyzable metallic compound) containing a water repellent group and a hydrolyzable functional group or a halogen atom, and b) a metallic compound that does not contain a water repellent group and contains a hydrolyzable functional group or halogen atom (water repellent group-free hydrolyzable metallic compound). The metallic oxide component derived from the compounds of a) and/or b) is an oxide of the metallic atoms included in the hydrolyzable metallic compound. The metallic oxide component may include a metallic oxide component derived from minute particles of a metallic oxide added to a coating solution for forming an antifog layer, and a metallic oxide component derived from a hydrolyzable metallic compound or a hydrolysate thereof added to the coating solution. Also here, the hydrolyzable metallic compound is at least one compound selected from the compounds of a) and b) above. The compound of b) above, namely the hydrolyzable metallic compound containing no water repellent groups, may include at least one of tetraalkoxysilane and a silane coupling agent. Hereinafter, excluding the compound of a) above, which has been already described, the minute particles of a metallic oxide and the compound of b) above will be described.

Minute Particles of Metallic Oxide

The antifog layer 43 may further contain minute particles of a metallic oxide as at least a portion of the metallic oxide component. The metallic oxide constituting the minute particles of a metallic oxide is an oxide of at least one type of element selected from Si, Ti, Zr, Ta, Nb, Nd, La, Ce, and Sn, for example, with minute particles of silica being preferable. The minute particles of silica can be introduced into the antifog layer by adding colloidal silica thereto, for example.

The minute particles of a metallic oxide excel at transmitting stress applied to the antifog layer to a transparent article that supports the antifog layer, and also have a high hardness. Therefore, the addition of the minute particles of a metallic oxide is advantageous from the viewpoint of enhancing the abrasion resistance and scratch resistance of the antifog layer. Moreover, when the minute particles of a metallic oxide are added to the antifog layer, minute voids are formed in portions where the minute particles are in contact with one another or close to one another, and water vapor is likely to become trapped in the antifog layer through these voids. Accordingly, the addition of the minute particles of a metallic oxide may advantageously act to enhance the antifog properties. Minute particles of a metallic oxide that have been formed in advance are added to a coating solution for forming an antifog layer, and the minute particles of a metallic oxide can thus be supplied to the antifog layer.

When the average particle diameter of the minute particles of a metallic oxide is excessively large, the antifog layer may be opaque, whereas when the average particle diameter of the minute particles of a metallic oxide is excessively small, the minute particles aggregate, thus making it difficult to uniformly disperse the minute particles. From this viewpoint, the average particle diameter of the minute particles of a metallic oxide is preferably 1 to 20 nm, and particularly preferably 5 to 20 nm. It should be noted that the average particle diameter of the minute particles of a metal oxide in the form of primary particles is taken as the average particle diameter of the minute particles of a metallic oxide described herein. The average diameter of the minute particles of a metallic oxide is determined by measuring, through observation using a scanning electron microscope, the particle diameters of fifty randomly selected minute particles and employing the average value thereof. If the content of the minute particles of a metallic oxide is excessively large, there is a risk that the amount of water absorption will decrease in the entire antifog layer, and thus the antifog layer becomes opaque. When the antifog layer contains the water absorbent resin, it is preferable to add the minute particles of a metallic oxide such that the amount thereof is 0 to 50 parts by mass, preferably 1 to 30 parts by mass, more preferably 2 to 30 parts by mass, even more preferably 5 to 25 parts by mass, and optionally 10 to 20 parts by mass, with respect to 100 parts by mass of the water absorbent resin.

Hydrolyzable Metallic Compound Containing No Water Repellent Groups

In addition, the antifog layer 43 may contain a metallic oxide component derived from a hydrolyzable metallic oxide compound that does not contain a water repellent group (water repellent group-free hydrolyzable compound). A preferable water repellent group-free hydrolyzable metallic compound is a hydrolyzable silicon compound that does not contain a water repellent group. The hydrolyzable silicon compound that does not contain a water repellent group is at least one type of silicon compound (it should be noted that a water repellent group is not contained) selected from silicon alkoxide, chlorosilane, acetoxysilane, alkenyloxysilane, and aminosilane, with silicon alkoxide that does not contain a water repellent group being preferable. It should be noted that an example of the alkenyloxysilane is isopropenoxysilane.

The hydrolyzable silicon compound that does not contain a water repellent group may be a compound represented by Formula (III) below.

$$SiY_4 \qquad \text{(III)}$$

As described above, Y represents a hydrolyzable functional group, and is preferably at least one selected from an alkoxyl group, an acetoxy group, an alkenyloxy group, an amino group, and a halogen atom.

The water repellent group-free hydrolyzable metallic compounds are hydrolyzed or partially hydrolyzed, and at least portions thereof are polycondensed. Thus, a metallic oxide component in which metallic atoms and oxygen atoms are linked is supplied. This component firmly joins the minute particles of a metallic oxide and the water absorbent resin, and may contribute to the enhancement of the abrasion resistance, hardness, water resistance, and the like of the antifog layer. When the antifog layer contains the water absorbent resin, it is preferable to set the amount of metallic oxide component derived from the hydrolyzable metallic compound that does not contain a water repellent group to be within a range of 0 to 40 parts by mass, preferably 0.1 to 30 parts by mass, more preferably 1 to 20 parts by mass, even more preferably 3 to 10 parts by mass, and optionally 4 to 12 parts by mass, with respect to 100 parts by mass of the water absorbent resin.

A preferable example of the hydrolyzable silicon compound that does not contain a water repellent group is tetraalkoxysilane, and more specifically, tetraalkoxysilane containing an alkoxy group having 1 to 4 carbon atoms. The tetraalkoxysilane is at least one selected from tetramethoxysilane, tetraethoxysilane, tetra-n-propoxysilane, tetraisopropoxysilane, tetra-n-butoxysilane, tetraisobutoxysilane, tetra-sec-butoxysilane, and tetra-tert-butoxysilane, for example.

If the content of the metallic oxide (silica) component derived from tetraalkoxysilane is excessively large, the antifog properties of the antifog layer may be impaired. One reason for this is that the flexibility of the antifog layer is impaired, and thus the swelling and shrinkage of the antifog layer caused by the absorption and discharge of moisture are limited. When the antifog layer contains the water absorbent resin, it is preferable to add the metallic oxide component derived from tetraalkoxysilane such that the amount thereof is within a range of 0 to 30 parts by mass, preferably 1 to 20 parts by mass, and more preferably 3 to 10 parts by mass, with respect to 100 parts by mass of the water absorbent resin.

Another preferable example of the hydrolyzable silicon compound that does not contain a water repellent group is a silane coupling agent. The silane coupling agent is a silicon compound containing active functional groups that are different from each other. It is preferable that a portion of the active functional groups are hydrolyzable functional groups. An example of the silane coupling agent is a silicon compound containing an epoxy group and/or an amino group and a hydrolyzable functional group. Preferable examples of the silane coupling agent include glycidyloxyalkyltrialkoxysilane and aminoalkyltrialkoxysilane. It is preferable that, in these silane coupling agents, an alkylene group that is directly linked to a silicon atom has 1 to 3 carbon atoms. Since a glycidyloxyalkyl group and an aminoalkyl group contain a hydrophilic functional group (epoxy group, amino group), they are not water-repellent as a whole even though they contain an alkylene group.

The silane coupling agent firmly couples water absorbent resin, which is an organic component, and the minute particles of a metallic oxide and the like, which are inorganic components, and may contribute to the enhancement of the abrasion resistance, hardness, water resistance, and the like of the antifog layer. However, when the content of the metallic oxide (silica) component derived from the silane coupling agent is excessively large, the antifog properties of the antifog layer is impaired, and the antifog layer may be opaque in some cases. When the antifog layer contains the water absorbent resin, it is preferable to add the metallic oxide component derived from the silane coupling agent such that the amount thereof is within a range of 0 to 10 parts by mass, preferably 0.05 to 5 parts by mass, and more preferably 0.1 to 2 parts by mass, with respect to 100 parts by mass of the water absorbent resin.

Cross-Linked Structure

In addition, the antifog layer 43 may also include a cross-linked structure formed using a cross-linking agent, preferably at least one type of cross-linking agent selected from an organic boron compound, an organic titanium compound, and an organic zirconium compound. The introduction of the cross-linked structure enhances the abrasion resistance, scratch resistance, and water resistance of the antifog layer. From another viewpoint, the introduction of the cross-linked structure facilitates the improvement of the durability of the antifog layer without impairing the antifog properties.

When the cross-linked structure formed using a cross-linking agent is introduced into the antifog layer in which the metallic oxide component is a silica component, the antifog layer may contain a metallic atom other than silicon, preferably boron, titanium, or zirconium, in addition to silicon, as metallic atoms.

There is no particular limitation on the type of cross-linking agent as long as the used water absorbent resin can be cross-linked. Here, only examples of the organic titanium compound will be listed. The organic titanium compound is at least one selected from a titanium alkoxide, a titanium chelate-based compound, and titanium acylate, for example. Examples of the titanium alkoxide include titanium tetraisopropoxide, titanium tetra-n-butoxide, and titanium tetraoctoxide. Examples of the titanium chelate-based compound include titanium acetylacetonate, titanium ethyl acetoacetate, titanium octyleneglycol, titanium triethanolamine, and titanium lactate. The titanium lactate may be an ammonium salt thereof (titanium lactate ammonium). An example of the titanium acylate is titanium stearate. A preferable organic titanium compound is a titanium chelate compound, particularly titanium lactate.

When the water absorbent resin is polyvinyl acetal, a preferable cross-linking agent is an organic titanium compound, particularly titanium lactate.

Other Optional Components

Other additives may also be blended into the antifog layer 43. Examples of the additives include glycols such as glycerin and ethylene glycol that have the function of improving the antifog properties. A surfactant, a leveling agent, an ultraviolet absorbing agent, a coloring agent, an antifoaming agent, an antiseptic agent, and the like may be used as the additives. Blending a surfactant into the material of the antifog layer 43 makes it likely that a liquid agent spreads on the substrate film 42 when the antifog layer 43 is formed by applying the liquid agent onto the substrate film 42. Therefore, it is possible to make it less likely that the surface of the formed antifog layer 43 becomes uneven. Therefore, it is possible to suppress warping of the antifog layer 43. Accordingly, an antifog sheet that is suitable for being attached to the information acquisition region 3 can be provided. It should be noted that examples of the surfactant include BYK-323, BYK-333, BYK-342, BYK-377, and BYK-3455, which are manufactured by BYK; KP-109, KP-110, and KP-112, which are manufactured by Shin-Etsu Chemical Co., Ltd.; and TSF4440, TSF4452, and TSF4450, which are manufactured by Momentive.

As is clear from the description above, a preferable embodiment of the antifog layer 43 has a configuration as described below. That is, it is preferable that the antifog layer 43 contains 0.1 to 60 parts by mass of the metallic oxide component and 0.05 to 10 parts by mass of the water repellent groups, with respect to 100 parts by mass of the water absorbent resin. At this time, the water repellent groups may be chain alkyl groups having 1 to 8 carbon atoms and be directly linked to metallic atoms included in the metallic oxide component, and the metallic atoms may be silicon atoms. Moreover, at least a portion of the metallic oxide component may be a hydrolyzable metallic compound derived from a hydrolyzable metallic compound or a hydrolysate of the hydrolyzable metallic compound that is added to a coating solution for forming an antifog layer, and the hydrolyzable metallic compound may be at least one selected from a hydrolyzable metallic compound that contains a water repellent group and a hydrolyzable metallic compound that does not contain a water repellent group. Furthermore, the hydrolyzable metallic compound that does not contain a water repellent group may include at least one of tetraalkoxysilane and silane coupling agents. Configuring the antifog layer 43 as described above makes it possible to suppress fogging of the information acquisition region 3, and thus the camera 81 and the radar 82 can appropriately acquire information about the outside of a vehicle.

An example of the above-described antifog layer 43 can be obtained as follows. First, 87.5 mass % of a solution containing a polyvinyl acetal resin ("S-LEC KX-5" manufactured by Sekisui Chemical Co., Ltd.; a solid content is 8 mass %, the degree of acetalization is 9 mol %, and an acetal structure derived from benzaldehyde is included), 0.526 mass % of n-hexyltrimethoxysilane (HTMS, "KBM-3063" manufactured by Shin-Etsu Chemical Co., Ltd.), 0.198 parts by mass of 3-glycidoxypropyltrimethoxysilane (GPTMS, "KBM-403" manufactured by Shin-Etsu Chemical Co., Ltd.), 2.774 mass % of tetraethoxysilane (TEOS, "KBE-04" manufactured by Shin-Etsu Chemical Co., Ltd.), 5.927 mass % of an alcohol solvent ("Solmix AP-7" manufactured by Alcohol Trading Co., Ltd.), 2.875 mass % of purified water, 0.01 mass % of hydrochloric acid serving as an acid catalyst, and 0.01 mass % of a leveling agent ("KP-341" manufactured by Shin-Etsu Chemical Co., Ltd.) are placed in a glass container, and stirred at room temperature (25° C.) for 3 hours. A coating solution for forming the antifog layer 43 can thus be prepared.

(B) Substrate Film and Gluing Agent Layer

Next, the substrate film 42 and the sticky layer 41 will be described. The substrate film 42 serves as a substrate for the antifog sheet 4, and the antifog layer 43 and the sticky layer 41 are respectively held on its two surface sides. Moreover, the sticky layer 41 serves to bond the antifog sheet 4 to a subject. The material of the sticky layer 41 may be selected as appropriate according to the embodiment as long as a transparent material with which the antifog sheet 4 can be attached to the surface on the vehicle interior side of the information acquisition region 3 is used. For example, the sticky layer 41 can be formed of an acrylic adhesive or a silicone adhesive.

There is no particular limitation on the material of the substrate film 42, and the substrate film 42 can be formed of a transparent resin sheet made of polyethylene, polyethylene terephthalate, or the like. It should be noted that the substrate film 42 can be made of a material having a thermal conductivity of $5 \times 10^{-4}$ cal/cm·sec·° C. or less. This makes it possible to block the dissipation of heat from the inside of the vehicle to the outside of the vehicle. An example of a material that satisfies such a condition is COSMOSHINE A4300 (manufactured by TOYOBO Co., Ltd.).

(C) Manufacturing Method

Next, a method for manufacturing an antifog sheet 4 as described above will be described. The antifog sheet 4 can be manufactured by forming the antifog layer 43 on one surface of the substrate film 42 and applying a gluing agent on the other surface to form the sticky layer 41.

The antifog layer 43 can be formed by applying a coating solution (liquid agent) for forming the antifog layer 43 onto the substrate film 42, drying the substrate film 42 onto which the coating solution has been applied, and further performing high-temperature and high-humidity treatment or the like as needed. It is sufficient that conventionally known materials and methods are respectively used as the solvent to be used for the preparation of the coating solution and a method for applying the coating solution.

In the step of applying the coating solution, the atmosphere is preferably kept at a relative humidity less than 40%, and more preferably 30% or less. Keeping the atmosphere at a low relative humidity makes it possible to prevent the film from absorbing an excessive amount of moisture from the atmosphere. If a large amount of moisture is absorbed from the atmosphere, there is a risk that water will enter and remain in the matrix of the film and cause the strength of the film to deteriorate.

It is preferable that the step of drying the substrate film 42 onto which the coating solution has been applied includes an air-drying step and a heat-drying step for performing drying by heating. It is preferable to perform the air-drying step by exposing the coating solution to the atmosphere that is maintained at a relative humidity less than 40%, and more preferably 30% or less. The air-drying step can be performed as a non-heating step. In other words, it can be performed at room temperature. When the coating solution contains a hydrolyzable silicon compound, in the heat-drying step, dehydration progresses in which silanol groups contained in the hydrolysates of silicon compounds and the like and hydroxy groups present on a transparent article are involved, and a matrix structure (network of Si—O bonds) develops including silicon atoms and oxygen atoms.

In order to prevent the decomposition of organic substances such as the water absorbent resin, it is preferable that the temperature applied in the heat-drying step is not excessively high. In this case, an appropriate heating temperature is 300° C. or lower (e.g., 100 to 200° C.), and the heating time is 1 minute to 1 hour.

A high-temperature and high-humidity treatment step may by performed as appropriate during the formation of the antifog layer 43. Performing the high-temperature and high-humidity treatment step may further facilitate the realization of both the antifog properties and the strength of the film. The high-temperature and high-humidity treatment step can be performed by holding the antifog layer 43 in the atmosphere at 50 to 100° C. at a relative humidity of 60 to 95% for 5 minutes to 1 hour. The high-temperature and high-humidity treatment step may be performed after the application step and the drying step, or after the application step and the air-drying step and before the heat-drying step. In particular, in the former case, a heat-treatment step may be additionally performed after the high-temperature and high-humidity treatment step. This additional heat-treatment step can be performed by holding the antifog layer 43 in the atmosphere at 80 to 180° C. for 5 minutes to 1 hour.

The antifog layer 43 made of the coating solution may be washed and/or wiped with a moist cloth as needed. Specifically, this can be performed by exposing the surface of the antifog layer 43 to a stream of water or wiping it with a cloth containing water. Pure water is suitable as the water used in these steps. It is preferable to avoid using a solution containing a detergent for washing. With this step, dust, dirt, and the like attaching to the surface of the antifog layer 43 are removed, and a clean coating surface can thus be obtained.

(D) Thicknesses of Layers

Next, the thicknesses of the layers will be described. The thicknesses of the layers may be set as appropriate according to the embodiment. For example, the thickness of the sticky layer 41 may be set to be within a range of several micrometers to several hundred micrometers.

As shown in the example in FIG. 2, a thickness D2 of the substrate film 42 can be set to be larger than a thickness D1 of the blocking layer 2. If the thickness D2 is reduced, the antifog sheet 4 will be excessively soft, which may make it difficult to attach the antifog sheet 4 to the laminated glass 1. On the other hand, if the thickness D2 is increased, the antifog sheet 4 cannot be made thinner. From this viewpoint, it is preferable to set the thickness D2 of the substrate film 42 to be within a range of 75 µm to 150 µm, for example. At this time, from the viewpoint of blocking heat exchange, the thickness D2 of the substrate film 42 is preferably 75 µm or more and more preferably 100 µm or more. The thickness D1 of the blocking layer 2 may be set to be smaller than the thickness D2 as appropriate.

When the thickness D2 of the substrate film 42 is made larger than the thickness D1 of the blocking layer 2, the upper surface of the antifog sheet 4 can be arranged at a position higher than the upper surface of the blocking layer 2 in the case where the laminate glass 1 side is taken as the lower side as shown in the example in FIG. 2. Therefore, it is possible to prevent the blocking layer 2 from physically interfering while the antifog sheet 4 is being attached to the surface on the vehicle interior side of the information acquisition region 3, thus making it possible to easily attach the antifog sheet 4.

In addition, the thickness of the substrate film 42 is relatively increased on the basis of the thickness D1 of the blocking layer 2, thus making it possible to sufficiently ensure the heat blocking properties of the substrate film 42.

Moreover, a thickness D3 of the antifog layer 43 may be adjusted as appropriate according to required antifog performance and the like. For example, the thickness D3 of the antifog layer 43 can be set to be within a range of 1 µm to 20 µm, preferably a range of 2 µm to 15 µm, and more preferably a range of 3 µm to 10 µm.

(E) Shape and Planar Size

Next, the shape and planar size of the antifog sheet 4 will be described. As shown in the example in FIG. 4, in this embodiment, the antifog sheet 4 is formed in a rectangular shape in a plan view, and has four corner portions 46. The corner portions 46 are rounded. This makes it less likely that the antifog sheet 4 will peel away from the surface on the vehicle interior side of the information acquisition region 3. In particular, this is advantageous when the antifog sheet 4 is arranged in the region surrounded by the bracket 6. That is, the temperature inside the bracket 6 is likely to rise, and therefore, when the substrate film 42 has a large thermal expansion rate, stress is likely to be applied to the substrate film 42 due to the difference between swelling of the substrate film 42 and swelling of the glass plate. Therefore, rounding the corner portions as described above makes it possible to prevent the antifog sheet 4 from peeling away even under conditions where an external force does not act thereon such as a case where the temperature rises.

It should be noted that the case where the substrate film 42 has a large thermal expansion rate refers to a case where the substrate film 42 is made of such a substrate material that the substrate film 42 has a thermal shrinkage percentage of 0.7% or more when allowed to stand at 150° C. for 30 minutes (when measured according to JIS C2318). Examples of such a material include Tetoron Film (manufactured by Teijin) and COSMOSHINE A4300 (manufactured by TOYOBO Co., Ltd.).

At least one corner portion of all of the corner portions of the antifog sheet 4 can be formed to have a radius of curvature of roundness that is smaller than those of the other corner portions. In this case, a state in which the radius of curvature is small encompasses a state in which the radius of curvature is very small and an acute angle is formed. Setting the radius of curvature of the corner portion to be small in this manner makes it easy to remove the antifog sheet using this corner portion as a starting point.

In general, the antifog sheet 4 is required to be less likely to peel away after being attached, but needs to be removed for the purpose of replacement or the like. In particular, the antifog layer 43 is made of an organic material and thus needs to be replaced due to deterioration caused by temporal change in some cases. Moreover, the antifog sheet 4 may need to be replaced due to operation failure during the attachment of the bracket.

When a dustproof sheet is attached to a highly smooth subject such as a glass plate, it is difficult to remove the antifog sheet 4. Therefore, forming at least one corner portion so as to have a small radius of curvature as described above makes it easy to remove the antifog sheet 4 using such a corner portion as a starting point. When a corner portion having a small radius of curvature is arranged on the blocking layer 2, it is particularly easy to remove the antifog sheet 4.

Moreover, the planar size of the antifog sheet 4 is larger than the planar size of the information acquisition region 3 and smaller than the planar size of the opening 23 of the blocking layer 2. For example, the planar size of the antifog sheet 4 may be set to be smaller than the planar size of the opening 23 by 2 mm in both the vertical direction and the horizontal direction.

As shown in the example in FIG. 4, this enables the antifog sheet 4 to fit in the opening 23, thus making it possible to prevent the antifog sheet 4 from straddling the step formed between the surface on the vehicle interior side of the information acquisition region 3 and the blocking layer 2 (protruding portion 22). Accordingly, the antifog sheet 4 can be easily attached to the information acquisition region 3, and it is possible to almost prevent gaps (air bubbles) that inhibit the camera 81 and the radar 82 from acquiring information from being formed between the surface on the vehicle interior side of the information acquisition region 3 and the antifog sheet 4.

Moreover, as described above, the blocking layer 2 is made of a dark-colored ceramic or the like and thus may reach a high temperature (e.g., 105° C.). Therefore, even if only a portion of the antifog sheet 4 is attached onto the blocking layer 2, it may be the case that the antifog sheet 4 is required to have high thermal resistance. By contrast, with this embodiment, the antifog sheet 4 can be attached to the information acquisition region 3 such that a portion thereof is not on the blocking layer 2. Accordingly, an antifog sheet with relatively low thermal resistance can also be used as the antifog sheet 4.

Furthermore, the substrate film 42 is made of a material such as polyethylene or polyethylene terephthalate that is more likely to thermally expand than the laminated glass 1. Therefore, making the planar size of the antifog sheet 4 smaller than the planar size of the opening 23 makes it possible to form a gap even in at least a partial region between the antifog sheet 4 and the edge of the opening 23 as shown in the examples in FIGS. 2 and 4. This makes it possible to prevent the antifog sheet 4 from expanding over the edge of the opening 23 and peeling away from the surface on the vehicle interior side of the information acquisition region 3 when the antifog sheet 4 thermally expands.

(F) Other Considerations

In this embodiment, as shown in the examples in FIGS. 2 and 4, a right edge 231 of the opening 23 and a right edge 44 of the antifog sheet 4 are in contact with each other. As described above, arranging the antifog sheet 4 such that at least a portion of the edge of the opening 23 and at least a portion of the edge of the antifog sheet 4 are in contact with each other makes it possible to perform positioning using the edge of the opening 23 and the edge of the antifog sheet 4. Therefore, it is possible to attach the antifog sheet 4 to the information acquisition region 3 accurately and easily.

Moreover, in this embodiment, as shown in the example in FIG. 2, the camera 81 for taking images of the outside of the vehicle using the information acquisition region 3 as the information acquisition region and the radar 82 configured to emit and/or receive a ray of light are lined up in the horizontal direction. Meanwhile, the portion where the edge 231 of the opening 23 and the edge 44 of the antifog sheet 4 are in contact with each other is arranged near the camera 81.

When the camera 81 and the radar 82 are compared, the angle of view, namely the information acquisition region 3, required for the camera 81 is wider than that required for the radar 82. To address this, with this embodiment, the edge 231 of the opening 23 and the edge 44 of the antifog sheet 4 are brought into contact with each other on the camera 81 side, thus making it possible to prevent a portion to which the antifog sheet 4 is not attached from entering the angle of view of the camera 81. In addition, it is possible to prevent a portion of the sticky layer 41 protruding from the edge 44 of the antifog sheet 4 from entering the angle of view of the camera 81 and thereby inhibiting the camera 81 from taking images.

Moreover, as shown in the examples in FIGS. 2 and 4, the planar size of the antifog sheet 4 is larger than the planar size of the information acquisition region 3, and therefore, a portion of the antifog sheet 4 protrudes toward the outside in the in-plane direction of the information acquisition region 3. Two attachment indication marks 45 for indicating that the antifog sheet 4 is attached are provided on this portion. The attachment indication marks 45 are opaque marks for indicating that the antifog sheet 4 is attached to the glass plate. The attachment indication marks 45 can be formed by being printed on the substrate film 42 using ink or the like, for example. Also, the attachment indication marks 45 may be formed not using ink or the like but through punching or the like.

Since the layers in the antifog sheet 4 are made of transparent materials, there is a case where the antifog sheet 4 attached to the surface on the vehicle interior side of the information acquisition region 3 cannot be confirmed. To address this, with this embodiment, providing the attachment indication marks 45 on the outer side in the in-plane direction of the information acquisition region 3 makes it possible to easily confirm that the antifog sheet 4 is attached to the surface on the vehicle interior side of the information acquisition region 3 while the camera 81 and the radar 82 are not inhibited from acquiring information.

It should be noted that the number of attachment indication marks 45 need not be limited to two, and may be one or three or more. Moreover, the type of the attachment indication marks 45 need not be limited to a circle shown in the example in FIG. 4, and the type may be selected from letters, figures, signs, and the like as appropriate according to the embodiment. Furthermore, the color of the attachment indication marks 45 may be selected as appropriate according to the embodiment as long as they can be visually confirmed.

Information Acquisition Device

Next, the camera 81 and the radar 82 will be described. The camera 81 and the radar 82 are examples of the information acquisition device arranged inside a vehicle. The camera 81 includes an image sensor such as a CCD (Charge Coupled Device) or a CMOS (Complementary MOS) and a lens system, and is configured so as to be capable of taking images of the conditions outside the vehicle through the information acquisition region 3. Images acquired by the camera 81 are transmitted to an image processing device (not shown).

The image acquisition device analyzes the types of subjects and the like based on the images acquired by the camera 81. For example, the types of subjects can be presumed using a known image analysis method such as pattern recognition. The image processing device is constituted by a computer including a storage unit, a control unit, an input/output unit, and the like so as to be capable of performing such image analysis and presenting a user (driver) with the results. Such an image processing device may be a device designed exclusively for a service to be provided, or a general-purpose device such as a PC (Personal Computer) or a tablet terminal.

The radar 82 is configured so as to be capable of emitting and/or receiving a ray of light. For example, the radar 82 includes a laser emitting element for emitting a laser beam, and a light receiving element for receiving reflected light, which is the laser beam reflected by an obstacle such as a preceding vehicle. The laser emitting element is constituted by a laser diode or the like, for example, so as to be capable of emitting a laser beam in a near infrared wavelength range of 850 nm to 950 nm. With this radar 82, the distance from the obstacle to the subject vehicle can be calculated based on the time elapsed between when the laser beam is emitted and when the reflected light is received. The calculated distance is transmitted to an external device via a connector and used for controlling a brake of the vehicle and the like.

Bracket and Cover

Figure 7:
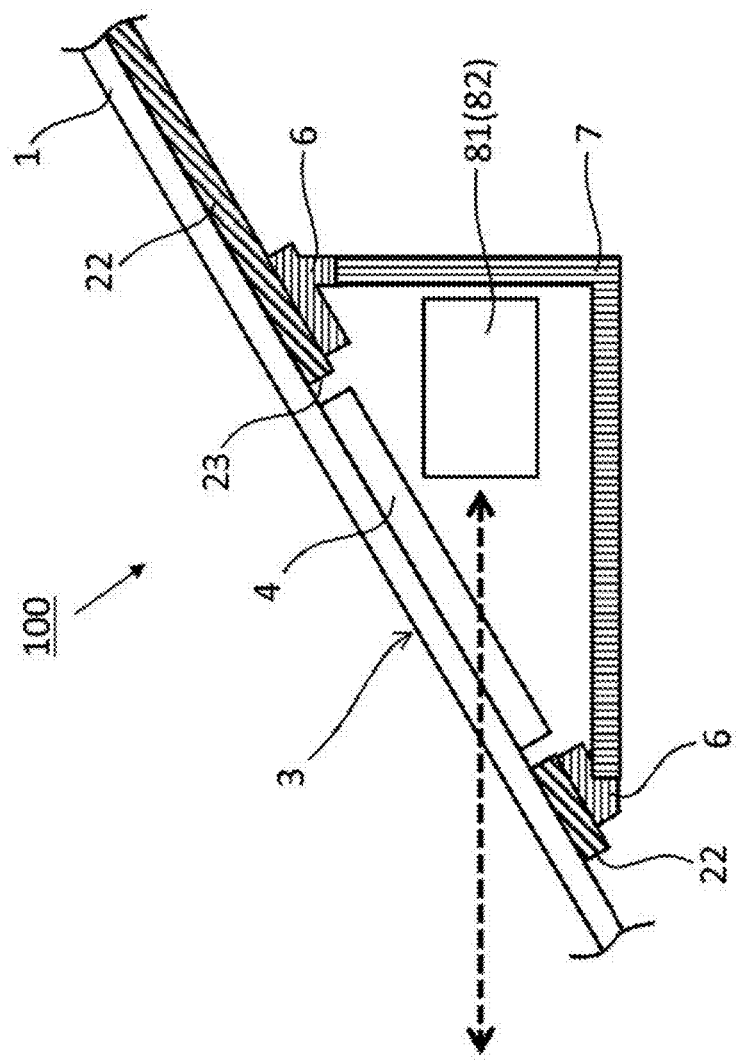
FIG. 7 schematically shows an example of a state in which a cover is attached to a bracket of the windshield according to the embodiment.
Figure 8A:
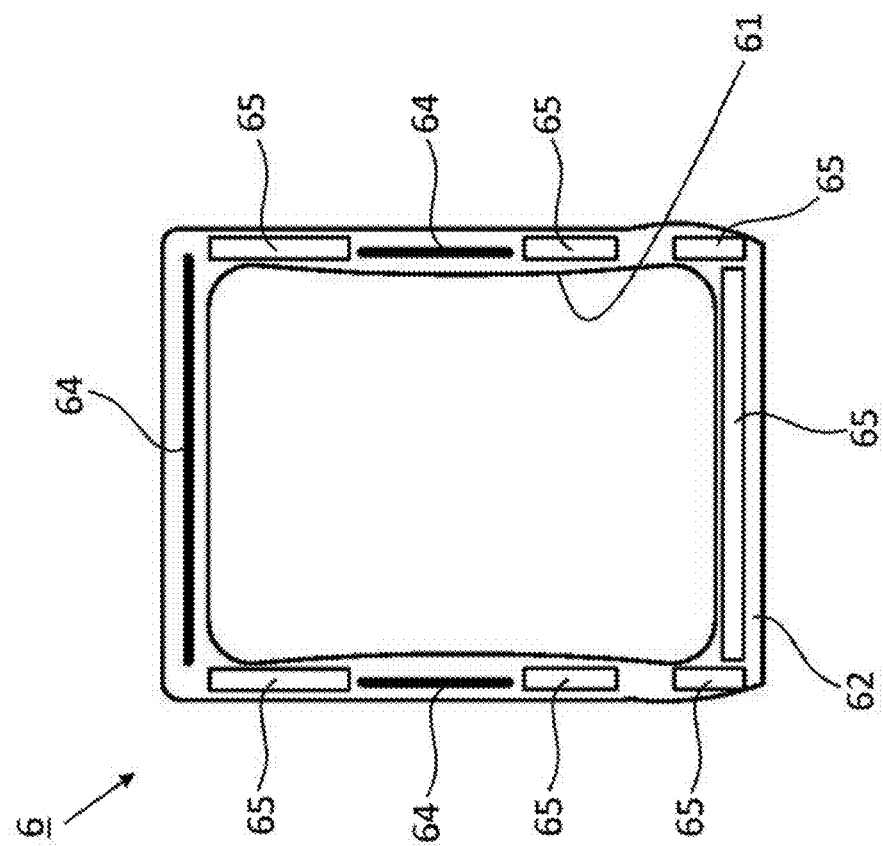
FIG. 8A schematically shows an example of a state on the vehicle exterior side of the bracket according to the embodiment.
Figure 8B:
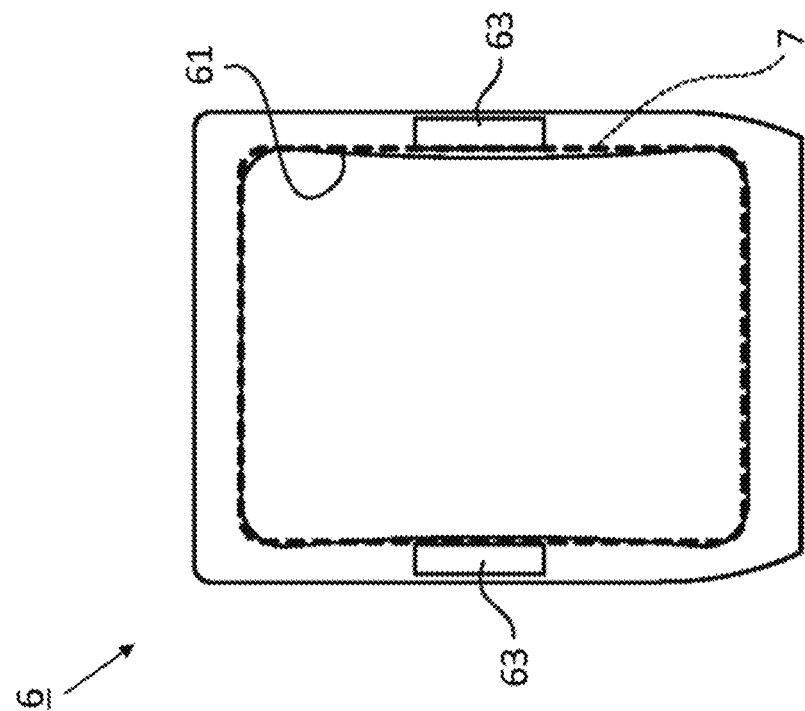
FIG. 8B schematically shows an example of a state on the vehicle interior side of the bracket according to the embodiment.
Figure 8C:
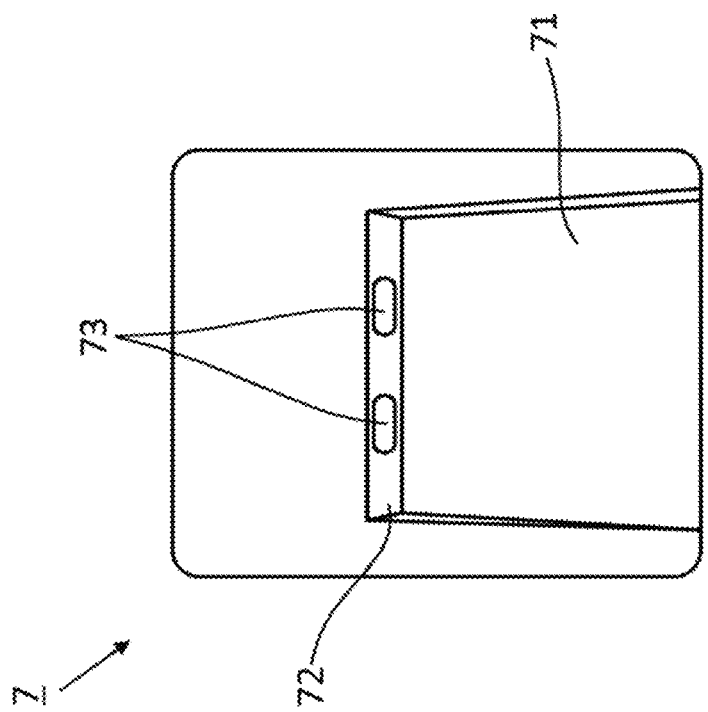
FIG. 8C schematically shows an example of the cover according to the embodiment.

Next, the bracket 6 and the cover 7 for mounting the above-described camera 81 and radar 82 to the windshield 100 will be described also referring to FIGS. 7 and 8A to 8C. FIG. 7 schematically shows an example of a state in which the bracket 6 and the cover 7 are attached to the windshield 100. FIG. 8A schematically shows an example of a state on the vehicle exterior side of the bracket 6 according to this embodiment. FIG. 8B schematically shows an example of a state on the vehicle interior side of the bracket 6 according to this embodiment. FIG. 8C schematically shows an example of the cover 7 according to this embodiment.

As shown in the examples in FIGS. 8A and 8B, in this embodiment, the bracket 6 is formed in a rectangular frame shape provided with an attachment opening 61 in which the cover 7 for holding the camera 81 and the radar 82 is arranged. This bracket 6 includes a rectangular main body 62 surrounding the attachment opening 61, and supporting portions 63 that are arranged on two sides of the main body 62 and used to fix the cover 7.

As shown in FIGS. 1 and 7, the bracket 6 is arranged around the opening 23 of the blocking layer 2. A flat surface is formed on the main body 62, and an adhesive 64 and double-sided adhesive tape 65 are attached to this flat surface. The main body 62 is bonded to the blocking layer 2 (protruding portion 22) or the laminated glass 1 using the adhesive 64 and the double-sided adhesive tape 65. Accordingly, the bracket 6 is fixed such that the entirety or at least a portion of the bracket 6 is blocked by the blocking layer 2 (protruding portion 22).

The types of the adhesive 64 and the double-sided adhesive tape 65 need not be particularly limited, and may be selected as appropriate according to the embodiment. For example, an adhesive such as a urethane resin adhesive or an epoxy resin adhesive can be used as the adhesive 64. Known double-sided adhesive tape can be used as the double-sided adhesive tape 65.

It should be noted that the arrangement of the adhesive 64 and the double-sided adhesive tape 65 shown in FIG. 8A is an example and need not be limited to this example. It should be noted that, with this embodiment, a region 232 on the lower side of the opening 23 is open. Accordingly, as shown in FIG. 8A, the bracket 6 can be visually confirmed from the vehicle exterior side through this portion, and therefore, it is preferable to use dark-colored double-sided adhesive tape 65 to make it difficult to visually confirm the bracket 6 from the outside of the vehicle.

After a harness (not shown) and the like are attached to the bracket 6, the cover 7 for holding the camera 81 and the radar 82 is attached thereto from the vehicle interior side as shown in FIG. 7. Accordingly, the camera 81 and the radar 82 are accommodated in a space surrounded by the bracket 6, the cover 7, and the laminated glass 1.

As shown in FIG. 8C, the cover 7 is formed in a rectangular shape, is supported by the bracket 6 via the supporting portions 63, and is arranged so as to cover the attachment opening 61. In the housing of the cover 7, a surface that is opposite to the laminated glass 1 via the attachment opening 61 is provided with a recessed portion 71. This recessed portion 71 is inclined such that the upper end is the deepest and the depth decreases toward the lower end. Lenses 73 of the camera 81 and the radar 82 are arranged in a wall surface 72 at the upper end. The lenses 73 are positioned as appropriate so as to correspond to the information acquisition region 3 (opening 23).

Therefore, when the cover 7 is attached to the bracket 6, the camera 81 and the radar 82 are supported by the bracket 6 and the cover 7, and, in this state, the camera 81 and the radar 82 can acquire information about the outside of the vehicle through the information acquisition region 3 (opening 23). It should be noted that light entering through the attachment opening 61 from the outside may have an adverse influence on the camera 81 and the radar 82 while they are taking images and performing measurement, respectively. Therefore, it is preferable that a light blocking member such as the adhesive 64 or double-sided adhesive tape 65 is provided so as to surround the recessed portion 71. It should be noted that the bracket 6 and the cover 7 may be produced as appropriate using a known processing method.

§ 2 Manufacturing Method

Next, a method for manufacturing the windshield 100 according to this embodiment will be described with reference to FIGS. 9A to 9D and 10. FIGS. 9A to 9D schematically show an example of a process of manufacturing the windshield 100 according to this embodiment. FIG. 10 shows an example of a process of manufacturing the laminated glass 1 according to this embodiment. It should be noted that the method for manufacturing the windshield 100, which will be described below, is merely an example, and the steps may be changed where possible. Also, steps of the manufacturing process, which will be described below, can be omitted, replaced, and added as appropriate according to the embodiment.

Figure 9A:
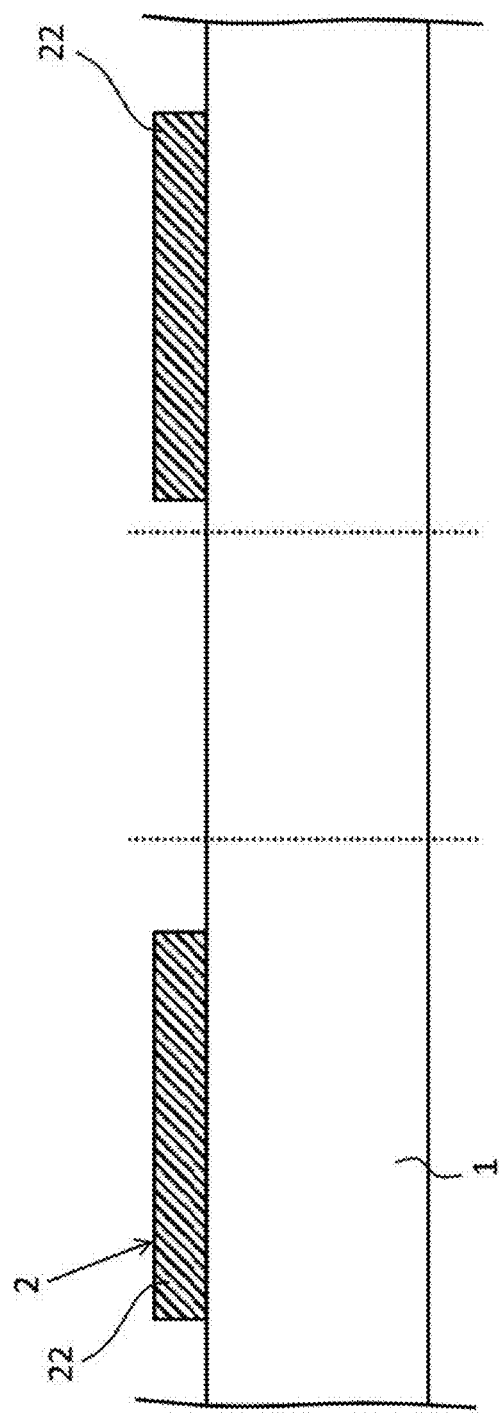
FIG. 9A schematically shows an example of a manufacturing process of the windshield according to the embodiment.
Figure 10:
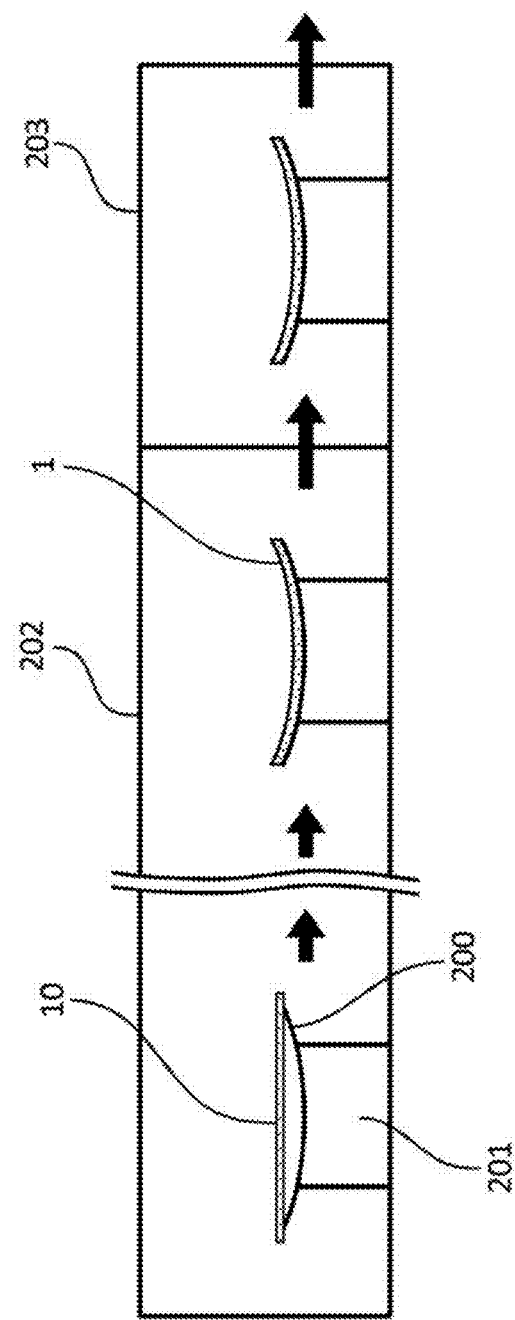
FIG. 10 schematically shows an example of the manufacturing process of the glass plate according to the embodiment.

First, in a first step, the laminated glass 1 provided with the blocking layer 2 is prepared as shown in FIG. 9A. The laminated glass 1 can be manufactured using a manufacturing line shown in the example in FIG. 10, for example. Specifically, the manufacturing line shown in the example in FIG. 10 includes a ring-shaped mold 200, a conveyance base 201 for conveying the mold 200, a heating furnace 202, and an annealing furnace 203.

Glass plates (11, 12) having a flat shape are prepared. Before being placed on the mold 200, the prepared glass plates (11, 12) are cut into predetermined shapes. Then, ceramic for forming the blocking layer 2 is printed (applied) onto the surface on the vehicle interior side of the inner glass plate 12 through screen printing or the like.

Next, the regions on which ceramic has been printed are dried as appropriate. A laminated glass 10 having a flat shape is formed by layering the outer glass plate 11 and the inner glass plate 12 such that the surface on the vehicle interior side of the outer glass plate 11 and the surface on the vehicle exterior side of the inner glass plate 12 face each other after the regions on which ceramic has been printed are dried. Then, the formed laminated glass 10 having a flat shape is placed on the mold 200. The mold 200 is arranged on the conveyance base 201, and the conveyance base 201 passes through the heating furnace 202 and the annealing furnace 203 in this order in the state in which the laminated glass 10 is placed on the mold 200. At this time, the inner glass plate 12 is placed on the mold such that the bottom face faces upward.

When the glass plates (11, 12) are heated to a temperature near the softening point in the heating furnace 202, the inner portions with respect to the peripheral edge portions of the glass plates (11, 12) curve downward under their own weight, and thus the glass plates (11, 12) are molded into a curved shape. Subsequently, the glass plates (11, 12) are conveyed from the heating furnace 202 into the annealing furnace 203 and annealed. Then, the glass plates (11, 12) are conveyed from the annealing furnace 203 to the outside and allowed to cool.

After the glass plates (11, 12) are molded as described above, the interlayer 13 is sandwiched between the glass plates (11, 12), and a laminate in which the glass plates (11, 12) and the interlayer 13 are layered is thus produced. This laminate is placed into a rubber bag and preliminarily bonded together at about 70 to 110° C. under vacuum suction. A method for performing preliminary bonding may be selected as appropriate according to the embodiment.

Next, permanent bonding is performed. The preliminarily bonded laminate is permanently bonded using an autoclave at 8 to 15 atmospheres at 100 to 150° C., for example. Specifically, permanent bonding can be performed under the conditions of 14 atmospheres and 135° C., for example. The glass plates (11, 12) are bonded in the state in which the interlayer 13 is sandwiched therebetween through the preliminary bonding and permanent bonding as described above. The curved laminated glass 1 provided with the blocking layer 2 with the opening 23 can thus be prepared.

Figure 9B:
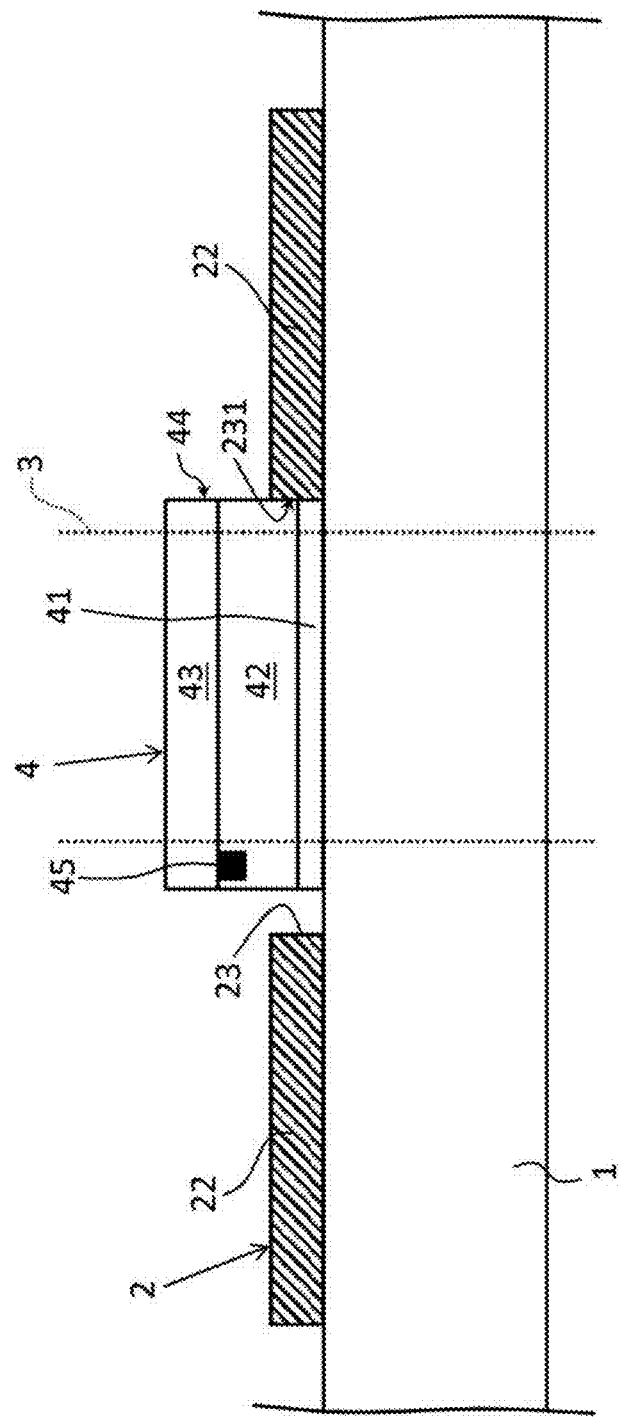
FIG. 9B schematically shows the example of the manufacturing process of the windshield according to the embodiment.
Figure 9C:
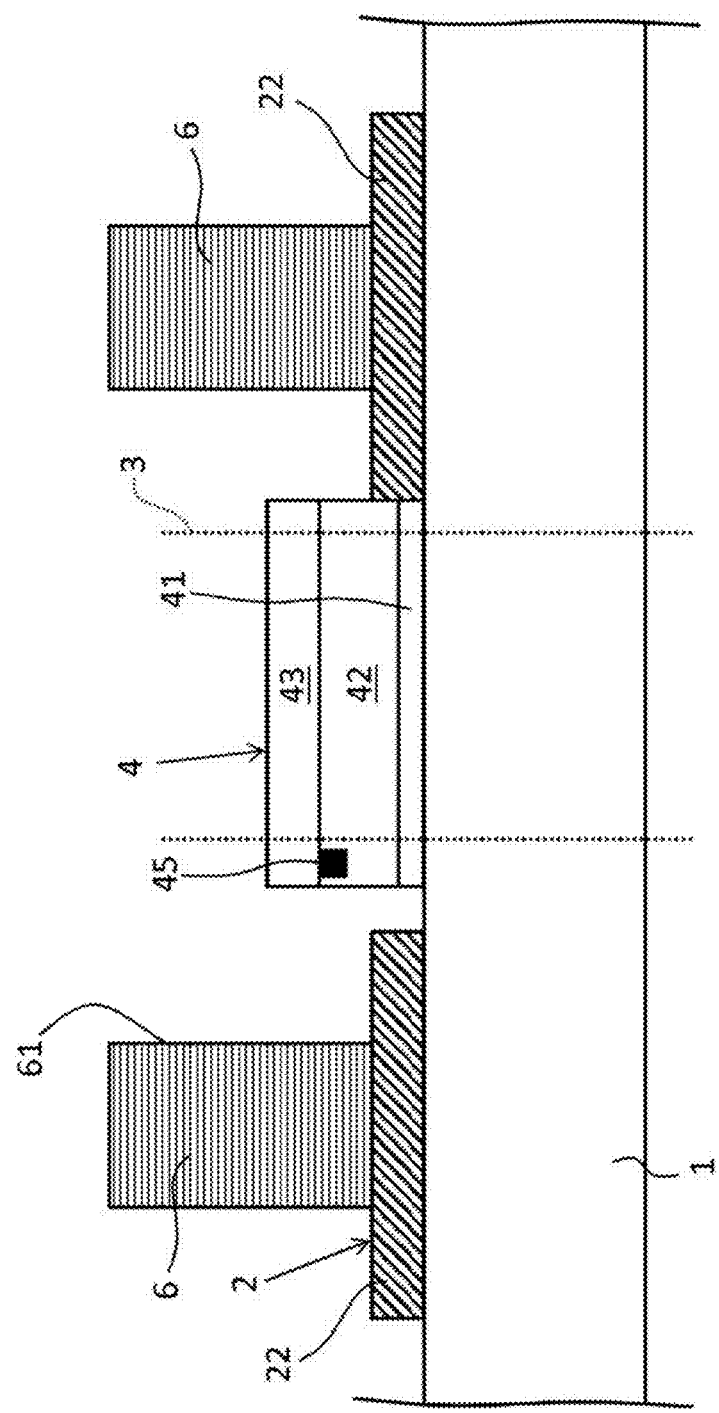
FIG. 9C schematically shows the example of the manufacturing process of the windshield according to the embodiment.

Next, in a second step, the antifog sheet 4 is prepared. Then, as shown in FIG. 9B, after being arranged such that the sticky layer 41 faces the surface on the vehicle interior side of the information acquisition region 3, the antifog sheet 4 is pressed against that surface. For example, a tool such as a squeegee is used to manually or automatically press the antifog sheet 4 against the surface on the vehicle interior side of the information acquisition region 3. The antifog sheet 4 can thus be attached to the surface on the vehicle interior side of the information acquisition region 3.

At this time, when the antifog sheet 4 is attached to the correct position, the right edge 44 of the antifog sheet 4 is arranged to come into contact with the edge 231 of the opening 23. Therefore, when this second step is performed, the positioning of the antifog sheet 4 can be performed by bringing the edge 44 of the antifog sheet 4 into contact with the edge 231 of the opening 23. In this embodiment, the operations in the second step can thus be easily performed.

Moreover, in this embodiment, the thickness D2 of the substrate film 42 of the antifog sheet 4 is larger than the thickness D1 of the blocking layer 2 (protruding portion 22). Therefore, in the case where the laminated glass 1 side is taken as the lower side, the upper surface of the antifog sheet 4 including a protective film 5 is located at a position higher than the upper surface of the blocking layer 2, and therefore, the blocking layer 2 does not physically interfere while the antifog sheet 4 is being pressed using a tool such as a squeegee. Therefore, in this embodiment, this also makes it easy to perform the operations in the second step.

Next, in a third step, the bracket 6 for attaching the cover 7 is prepared. As shown in the example in FIG. 9C, the prepared bracket 6 is arranged around the opening 23 of the blocking layer 2 and fixed using the adhesive 64 and the double-sided adhesive tape 65 such that at least a portion of the bracket 6 is blocked by the blocking layer 2.

Features

<1>

As described above, with this embodiment, the inner glass plate 12 is arranged such that its bottom surface faces the vehicle interior side, and the antifog sheet 4 is attached to this bottom surface. Therefore, the following effects can be obtained. That is, the layer containing tin (referred to as "tin-containing layer" hereinafter) is present in the bottom surface and can prevent the diffusion of alkali components of glass to the antifog sheet 4 side. This makes it possible to prevent the sticky layer 41 and the substrate film 42 of the antifog sheet 4 from becoming opaque due to alkali components. As a result, it is possible to avoid a case where light that is emitted by the sensor or enters the sensor cannot correctly pass through the antifog sheet 4 due to it being opaque. Therefore, a distance between vehicles or the like can be correctly calculated.

<2>

When the substrate film 42 whose thermal conductivity is adjusted as described above is used, the following effects can be obtained. That is, in the antifog sheet 4, using such a substrate film 42 makes it possible to block heat exchange between the antifog layer 43 having antifog properties and the laminated glass 1 (information acquisition region 3). Accordingly, even when the surface on the vehicle interior side of the information acquisition region 3 becomes cool, this substrate film 42 can suppress a case where the temperature of the antifog layer 43 of the antifog sheet 4 also decreases. Therefore, with this embodiment, it is possible to make it less likely that the temperature of the antifog layer 43 will decrease, thus making it possible to suppress impairment of the antifog function in the information acquisition region 3. For example, when the antifog layer 43 is of the water absorbent type as described above, it is possible to suppress a decrease in the saturated water absorption amount of the antifog layer 43. In particular, making the thickness D2 of the substrate film 42 larger than the thickness D1 of the blocking layer 2, for example, makes it possible to sufficiently ensure the heat blocking properties of the substrate film 42 and appropriately suppress the impairment of the antifog function in the information acquisition region 3.

It should be noted that, when the thickness value of the laminated glass 1 is taken as T1 (unit: mm) and the thickness value of the interlayer 13 is taken as T2 (unit: mm), and T1×T2 is 4 (dimensional unit is "mm$^2$") or less, dew condensation is likely to occur on the surface on the vehicle interior side of the laminated glass 1. When T1×T2 is 3 or less, or 2.5 or less, dew condensation is more likely to occur on the surface on the vehicle interior side of the laminated glass 1. Moreover, when the information acquisition region 3 is provided in a range of 250 mm or less from the upper end of the laminated glass 1, dew condensation is likely to occur on the surface on the vehicle interior side of the information acquisition region 3. When the information acquisition region 3 is provided in a range of 200 mm or less from the upper end of the laminated glass 1, dew condensation is more likely to occur on the surface on the vehicle interior side of the information acquisition region 3. The reason for this is that the flow of an air current has an effect. For the same reason, the information acquisition region 3 is provided in a range of 200 mm or less or 150 mm or less from both ends in the left-right direction, dew condensation is likely to occur on the surface on the vehicle interior side of the information acquisition region 3. Furthermore, the closer to the horizontal direction an angle at which the windshield 100 is attached is, the more likely dew condensation is to occur on the surface on the vehicle interior side of the laminated glass 1. For example, when an angle at which the windshield 100 is attached is 45° or less, or 30° or less, from the horizontal direction, dew condensation is likely to occur on the surface on the vehicle interior side of the laminated glass 1. In this case, the antifog function of the antifog sheet 4 is further exhibited.

Moreover, with this embodiment, the blocking layer 2 (protruding portion 22) is provided in the region surrounding the information acquisition region 3 and the camera 81 and the radar 82 are mounted thereon, and therefore, the temperature therearound is likely to rise due to the camera 81 and the radar 82 generating heat and the blocking layer 2 being heated. In addition, as described above, the temperature around the information acquisition region 3 is less likely to decrease due to the substrate film 42. Therefore, with this embodiment, heat around the information acquisition region 3 can be effectively utilized, thus making it possible to use the antifog sheet 4 to efficiently prevent fogging around the information acquisition region 3.

It should be noted that windshields may be stored in a warehouse for half a year or longer until they are used after being manufactured. At this time, humidity and temperature in the warehouse are often not controlled. Therefore, there is a possibility that the antifog performance of the antifog sheet 4 will be impaired. For example, in the case where an antifog sheet includes an absorbent-type antifog layer as the above-described embodiment, the antifog layer absorbs water when the humidity in the warehouse increases, and the antifog performance of the antifog sheet is thus impaired. To address this, in the above-described embodiment, a means for protecting the antifog layer 43 until the windshield 100 is used may be provided.

A sheet-like protective cover can be used as the means for protecting the antifog layer 42. This protective cover includes a release layer made of silicone or the like, and can be repeatedly attached to and removed from the antifog layer 42. Such a protective sheet can be provided with a distinction means. As a result, checking the distinction means on the protective sheet makes it possible to confirm whether or not the protective sheet has been attached to the antifog layer 42. It should be noted that a provided number, mark, or the like as well as a changed color can be utilized as the distinction means.

When the antifog layer 43 is formed using a polymer as a main component as described above, the antifog layer 43 is relatively soft and thus has low scratch resistance. Therefore, the antifog layer 43 may be damaged during a process of distributing the windshield 100. When the pencil hardness is approximately 4H or more, the antifog layer 43 is relatively hard, and scratch resistance is less likely to be a problem. On the other hand, when the pencil hardness is 2H or less, the antifog layer 43 is relatively soft, and scratch resistance is likely to be a problem. Therefore, the pencil hardness of the antifog layer 43 may be used as an index to determine whether or not a means for protecting the antifog layer 43 is employed. For example, it may be determined that the means for protecting the antifog layer 43 is to be employed when the pencil hardness is 2H or less, and the means for protecting the antifog layer 43 is not employed in the other cases.

§ 3 Modified Example

As described above, the embodiment of the present invention has been described in detail, but the foregoing description is, in all respects, merely an example of the present invention. It goes without saying that various improvements and modifications can be made without departing from the scope of the present invention. For example, the constituent elements of the above-described windshield 100 may be omitted, replaced, and added as appropriate according to the embodiment. Also, the shapes and sizes of the constituent elements of the above-described windshield 100 may be determined as appropriate according to the embodiment. For example, the following modifications are possible. It should be noted that in the following description, constituent elements that are similar to those of the above-described embodiment are denoted by similar reference numerals, and description of configurations that are similar to those of the above-described embodiment is omitted as appropriate.

3.1

With the above-described embodiment, the laminated glass 1 is formed in a substantially trapezoidal shape. However, the shape of the laminated glass 1 need not be limited to such an example and may be selected as appropriate according to the embodiment.

For example, with the above-described embodiment, the laminated glass 1 is formed in a curved shape through gravity bending molding. However, the method for molding the laminated glass 1 need not be limited to such an example and may be selected as appropriate according to the embodiment. The laminated glass 1 may also be formed in a curved shape through known press molding.

3.2

For example, with the above-described embodiment, the camera 81 and the radar 82 are used as the information acquisition devices. However, the information acquisition devices need not be limited to such examples as long as devices that can acquire information from the outside of a vehicle by emitting and/or receiving light are used, and may be selected as appropriate according to the embodiment. Moreover, the number of information acquisition devices installed inside a vehicle need not be limited to two and may be selected as appropriate according to the embodiment. Examples of the information acquisition device include a visible light/infrared camera for measuring the distance between vehicles, a light receiving device for receiving signals from the outside of the vehicle that are emitted by an optical beacon or the like, a camera using visible light and/or infrared rays that reads white lines on the road or the like as images, and a stereo camera that can identify the position of a subject through a stereoscopic vision. In addition, only one of the camera 81 and the radar 82 may be used, for example.

3.3

For example, with the above-described embodiment, the bracket 6 is formed in a frame shape, and the cover 7 is formed in a rectangular shape so as to be capable of being attached to the bracket 6. However, the shapes of the bracket 6 and the cover 7 need not be limited to such examples as long as they can support the information acquisition device and can be fixed to the blocking layer 2, and may be selected as appropriate according to the embodiment. The bracket 6 may also be provided with a plurality of openings so as to correspond to a plurality of information acquisition devices. In order to mount a plurality of information acquisition devices on the windshield 100, a plurality of pairs of the bracket 6 and the cover 7 may also be prepared and attached to the laminated glass 1.

3.4

For example, with the above-described embodiment, the upper region 221 and the lower region 222 of the blocking layer 2 have different layer structures. However, the blocking layer 2 need not be limited to such an example, and these regions may have the same layer structure. It should be noted that, when hot wires are provided within and/or around the opening 23, an electric current can be applied to the hot wires through the above-described silver layer 242. Therefore, in such a case, it is preferable that the blocking layer 2 has a layer structure including the silver layer 242 as described above.

For example, with the above-described embodiment, the blocking layer 2 is provided along the peripheral edge portion of the laminated glass 1. The blocking layer 2 may also be omitted. The shape of the blocking layer 2 need not be limited to the shape shown in the example in FIG. 1 and may be selected as appropriate according to the embodiment. The region 232 on the lower side of the edge of the opening 23 of the blocking layer 2 is open. However, the direction in which the open portion is open need not be limited to such an example and may be selected as appropriate according to the embodiment. The edge of the opening 23 may also be open in a plurality of directions.

Figure 11:
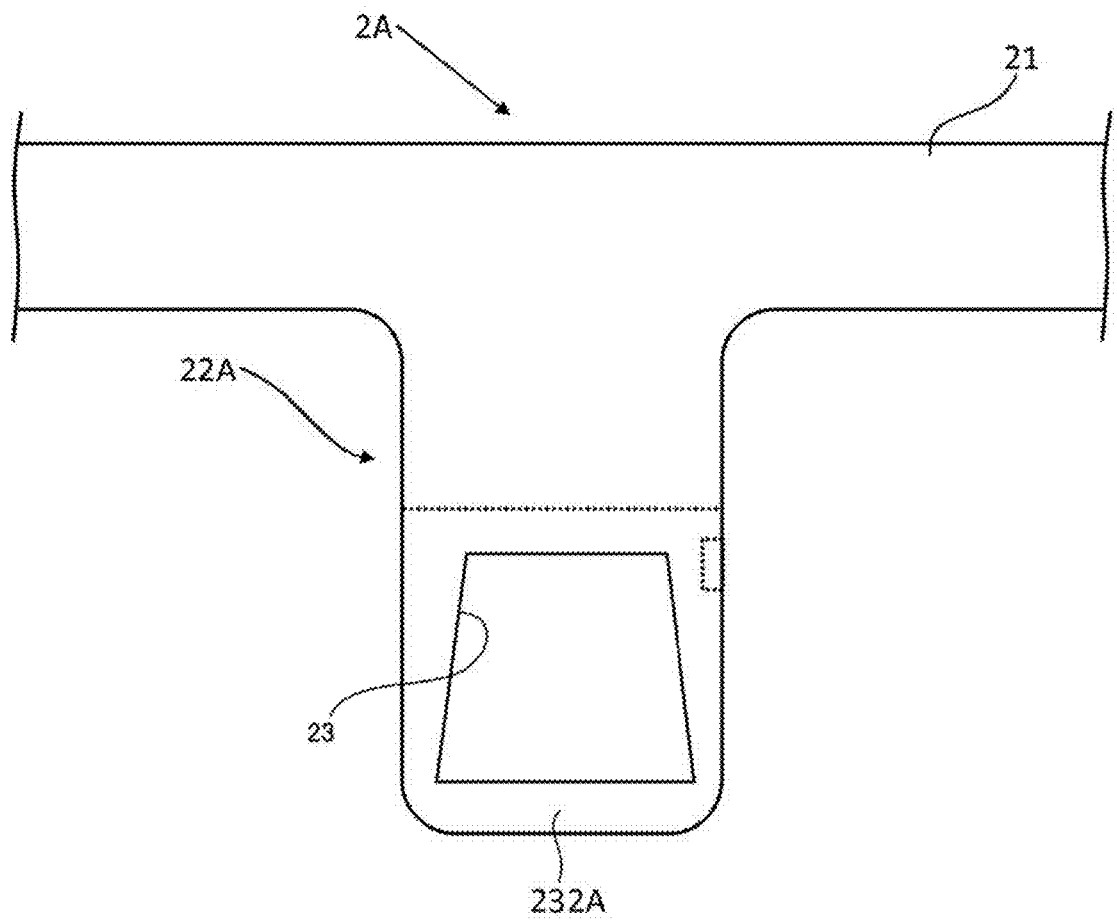
FIG. 11 schematically shows an example of a blocking layer according to another embodiment.

For example, as shown in the example in FIG. 11, the edge of the opening 23 is not open in any direction. FIG. 11 shows an example of a blocking layer 2A according to this modified example. As shown in FIG. 11, a protruding portion 22A is provided with a rectangular opening 23, and ceramic is also layered on a region 232A on the lower side with respect to the opening 23. As described above, the portion surrounding the opening 23 may be completely closed.

Figure 12:
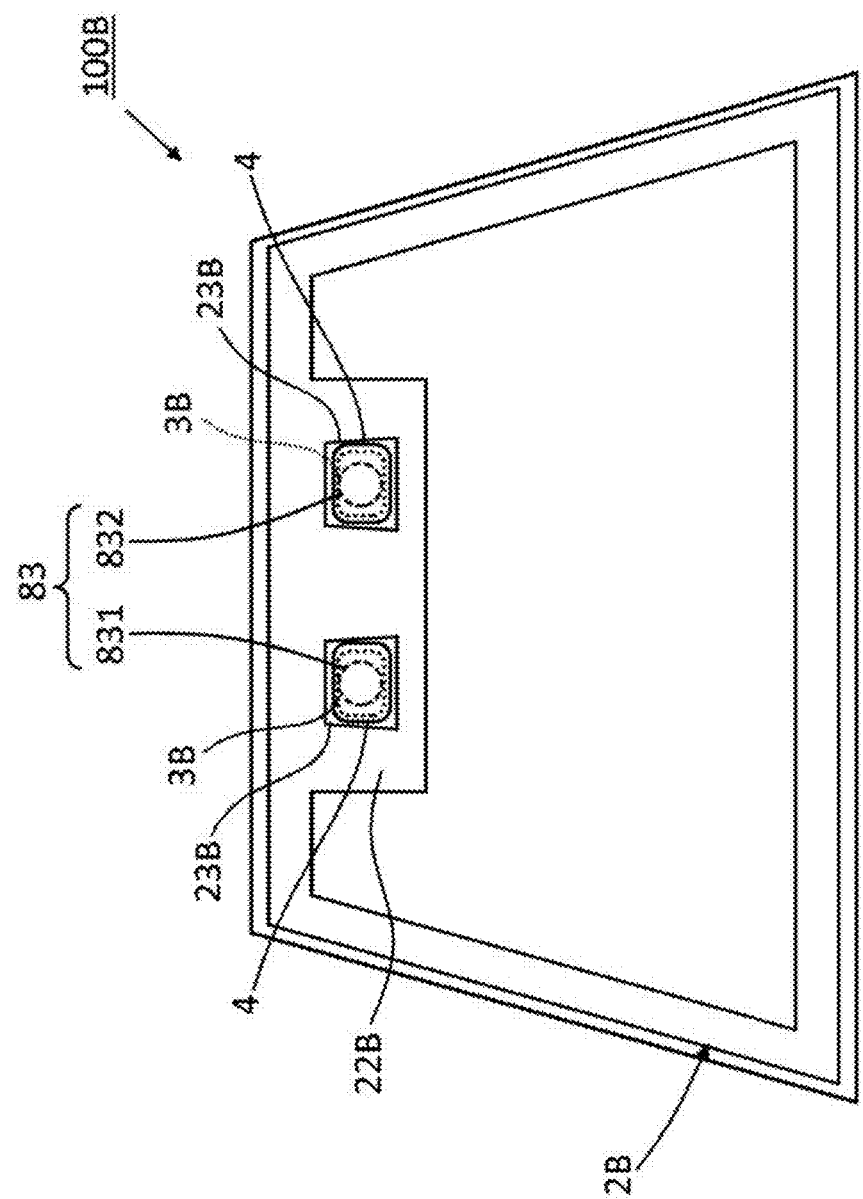
FIG. 12 schematically shows an example of a windshield according to another embodiment.

For example, in a case where a stereo camera is installed inside a vehicle as the information acquisition device as shown in the example in FIG. 12, the information acquisition regions 3 and the openings 23 may be provided at a plurality of positions. FIG. 12 shows an example of a windshield 100B on which a stereo camera 83 including two cameras (831, 832) can be mounted.

With the windshield 100B shown in the example in FIG. 12, a blocking layer 2B includes a protruding portion 22B that is slightly elongated in the left-right direction. This protruding portion 22B is provided with openings 23B at positions corresponding to the positions of the cameras (831, 832) of the stereo camera 83. Accordingly, information acquisition regions 3B are appropriately located within the openings 23B. At this time, as shown in FIG. 12, the antifog sheets 4 may be separately attached to the two information acquisition regions 3B.

Figure 13:
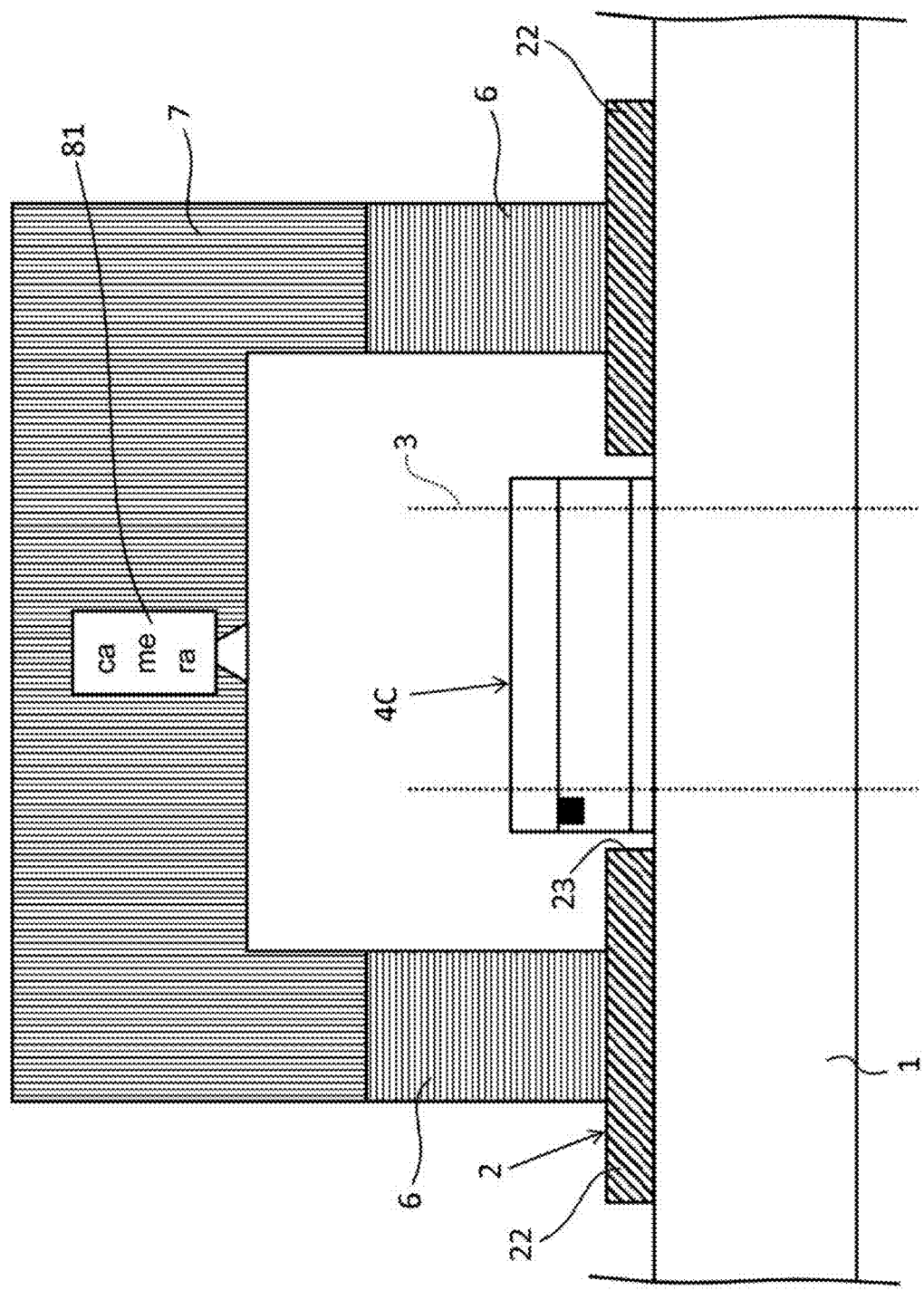
FIG. 13 schematically shows an example of the arrangement of an antifog sheet according to another embodiment.

Moreover, as shown in the example in FIG. 13, a configuration may be employed in which no portion of the edge of the antifog sheet 4 is in contact with the edge of the opening 23. FIG. 13 schematically shows an example of the arrangement of an antifog sheet 4C in this modified example. The planar size of the antifog sheet 4C shown in the example in FIG. 13 is smaller than the planar size of the opening 23, and no portion of the edge of the antifog sheet 4C is in contact with the edge of the opening 23. As described above, the antifog sheet may also be arranged so as not to be in contact with the edge of the opening of the blocking layer.

It should be noted that bringing at least a portion of the edge of the antifog sheet into contact with the edge of the opening of the blocking layer makes it possible to perform the positioning of the antifog sheet using such a portion. Therefore, in order to enable such positioning, the entirety of the edge of the antifog sheet 4 may be in contact with the edge of the opening 23 when the planar size of the antifog sheet 4 is substantially the same as the planar size of the opening 23. Moreover, when the planar size of the antifog sheet 4 is made smaller than the planar size of the opening 23, it is sufficient that any portion of the edge of the antifog sheet 4 is in contact with any portion of the edge of the opening 23.

For example, with the above-described embodiment, the blocking layer 2 is layered on the surface on the vehicle interior side of the inner glass plate 12. However, the surface on which the blocking layer 2 is layered need not be limited to such an example and may be selected as appropriate according to the embodiment. For example, the blocking layer 2 may also be layered on the surface on the vehicle interior side of the outer glass plate 11 and/or the surface on the vehicle exterior side of the inner glass plate 12.

For example, with the above-described embodiment, the configuration is employed in which the edge of the opening 23 of the blocking layer 2 and the edge of the antifog sheet 4 are in contact with each other on the right side in the left-right direction. However, the two edges may also be in contact with each other on the left side. That is, a configuration may also be employed in which a portion where the edge of the opening 23 of the blocking layer 2 and the edge of the antifog sheet 4 are in contact with each other is arranged on one side in the left-right direction.

In the laminated glass 1 according to the above-described embodiment, the opening 23 of the blocking layer 2 is arranged on the upper end side. Therefore, a worker attaches the antifog sheet 4 to the laminated glass 1 while facing the upper end side of the laminated glass 1. At this time, the worker holds a squeegee for attaching the antifog sheet 4 with his/her dominant hand, and moves the squeegee from the dominant hand side toward the opposite side. Accordingly, if the portion where the edge of the opening 23 of the blocking layer 2 and the edge of the antifog sheet 4 are in contact with each other is located on the dominant hand side, the workability of attaching the antifog sheet 4 can be enhanced.

For example, when performing work to attach the antifog sheet 4, a right-handed worker holds a squeegee with his/her right hand and moves the squeegee from right to left in a state in which the squeegee is pressed against the antifog sheet 4. At this time, when the edge of the opening and the edge of the antifog sheet are in contact with each other on the right side as in the above-described embodiment, the worker can place the antifog sheet 4 on the laminated glass 1, before using the squeegee, such that the edge 231 of the opening 23 and the edge 44 of the antifog sheet 4 are in contact with each other on the right side on which the worker holds the squeegee. Therefore, the worker can perform accurate positioning of the antifog sheet 4 and attach the antifog sheet 4 to the laminated glass 1 without positional shift by using the state in which the edge 231 of the opening 23 and the edge 44 of the antifog sheet 4 are in contact and moving the squeegee from right to left from such a contact position. Accordingly, locating the portion where the edge of the opening 23 of the blocking layer 2 and the edge of the antifog sheet 4 are in contact with each other on the worker's dominant hand side makes it possible to enhance the workability of attaching the antifog sheet 4. That is, when the antifog sheet is manually attached, the workability of attaching the antifog sheet can be enhanced in the workplace by determining the side on which the edge of the opening of the blocking layer and the edge of the antifog sheet are in contact with each other according to the ratio of the dominant hands of workers who perform such operations.

3.5

With the above-described embodiment, the planar size of the antifog sheet 4 is smaller than the planar size of the opening 23 of the blocking layer 2. However, the planar size of the antifog sheet 4 need not be limited to such an example and may also be larger than the planar size of the opening 23.

Figure 14:
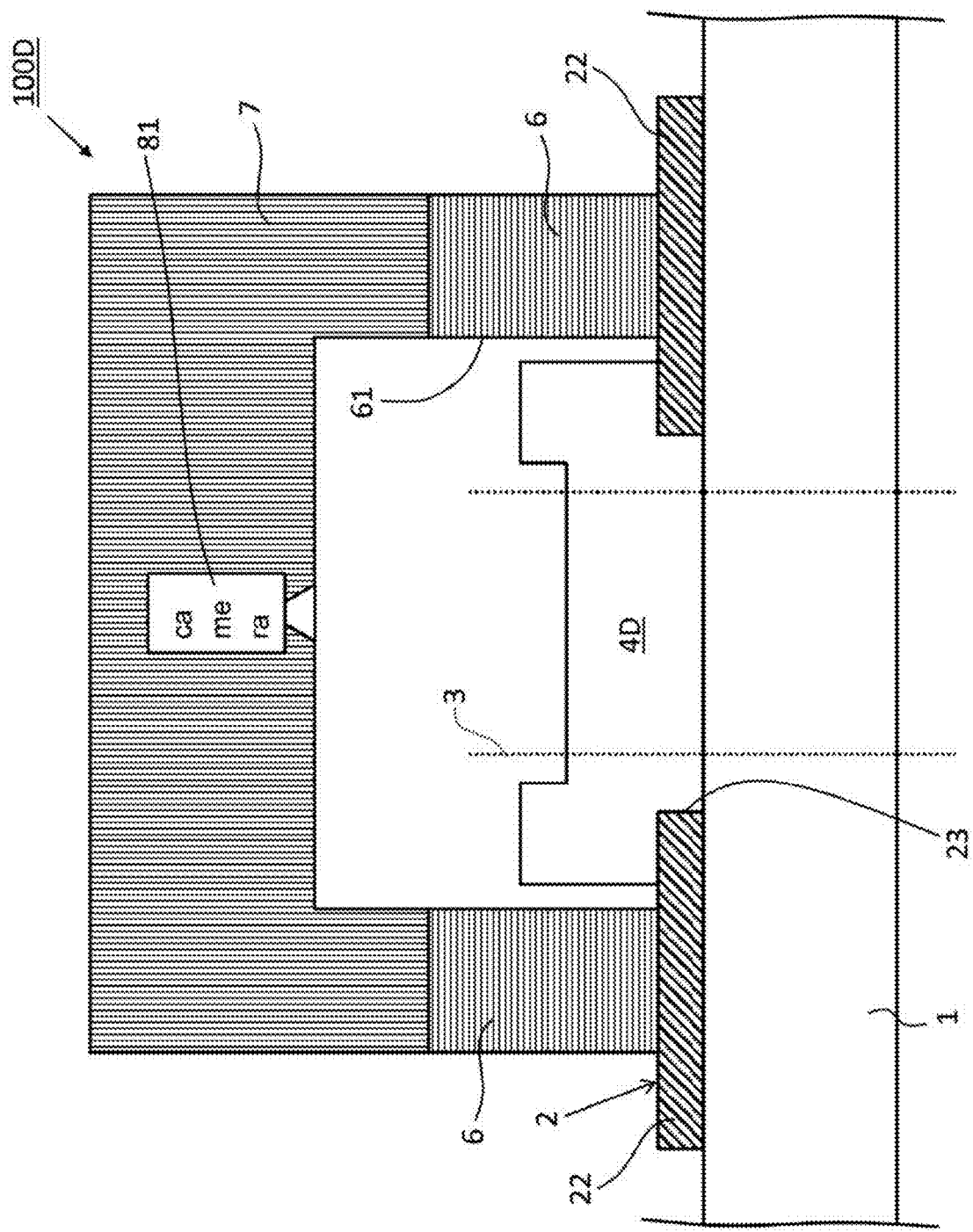
FIG. 14 schematically shows an example of an antifog sheet according to yet another embodiment.
Figure 15:
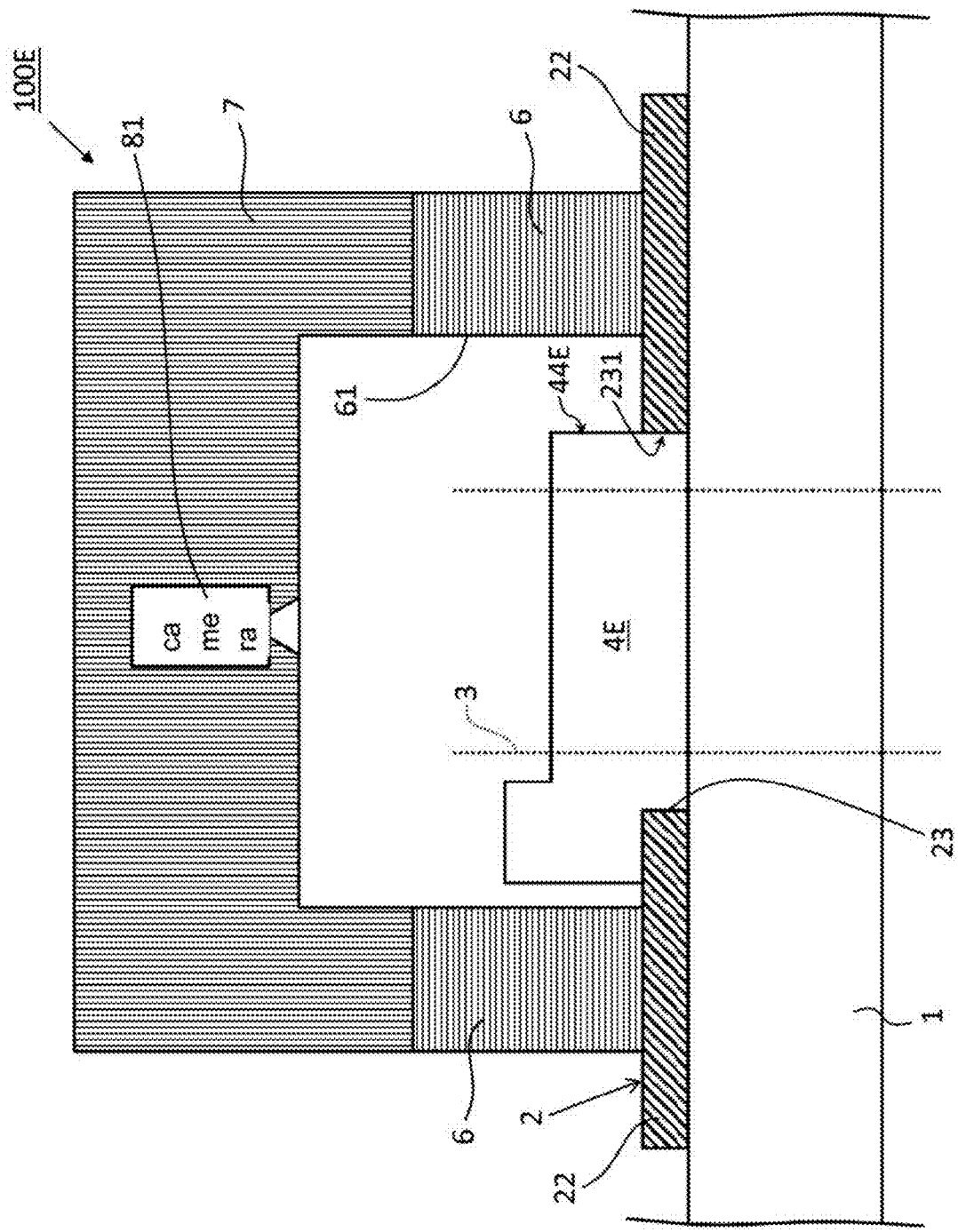
FIG. 15 schematically shows an example of an antifog sheet according to yet another embodiment.

For example, the planar size of the antifog sheet may also be set as shown in the examples in FIGS. 14 and 15. FIG. 14 schematically shows an example of a windshield 100D in which an antifog sheet 4D with a planar size larger than the planar size of the opening 23 is attached to the information acquisition region 3. For example, the planar size of the antifog sheet 4D may also be set to be larger by 10 mm in the vertical direction and the horizontal direction than the planar size of the opening 23. At this time, as shown in the example in FIG. 14, the planar size of the antifog sheet 4D is set to be smaller than the internal size (planar size of the attachment opening 61) of the bracket 6. Therefore, the antifog sheet 4D is attached to the surface on the vehicle interior side of the information acquisition region 3 such that a portion of the antifog sheet 4D is on the blocking layer 2 (protruding portion 22), but is not on the bracket 6.

In the case where the antifog sheet 4D is of the water absorbent type as mentioned above, the larger the size of the antifog sheet 4D is made, the higher the antifog ability imparted to the information acquisition region 3 is made. Therefore, making the planar size of the antifog sheet 4D larger than the planar size of the opening 23 in the same manner as in this modified example makes it possible to enhance the antifog ability imparted to the information acquisition region 3.

FIG. 15 schematically shows an example of a windshield 100E in which a right edge 44E of an antifog sheet 4E with a planar size larger than the planar size of the opening 23 is in contact with the right edge 231 of the opening 23. As shown in this diagram, even when the planar size of the antifog sheet 4E is made larger than the planar size of the opening 23, at least a portion of the edge of the antifog sheet 4E may also be in contact with the edge of the opening 23.

It should be noted that, although the layer structures of the antifog sheets are not shown in FIGS. 14 and 15, the antifog sheets (4D, 4E) have the same layer structure as that of the antifog sheet 4 according to the above-described embodiment.

3.6

With the above-described embodiment, the planar size of the opening 23 is larger than the planar size of the information acquisition region 3, and the planar size of the antifog sheet 4 is larger than the planar size of the information acquisition region 3 and smaller than the planar size of the opening 23. However, the relationship between the sizes of the constituents need not be limited to such an example and may be selected as appropriate according to the embodiment. For example, in order to enhance the workability of the antifog sheet 4, it is sufficient that the planar size of the antifog sheet 4 is smaller than the planar size of the opening 23, and the planar size of the information acquisition region 3 may be set as appropriate. Moreover, for example, the planar sizes of the opening 23, the information acquisition region 3, and the antifog sheet 4 may also be substantially the same.

3.7

For example, with the above-described embodiment, the thickness D2 of the substrate film 42 is larger than the thickness D1 of the blocking layer 2 (protruding portion 22) However, the thickness D2 of the substrate film 42 need not be limited to such an example, and may also be smaller than the thickness D1 of the blocking layer 2. In this case, the sum of the thickness D2 of the substrate film 42 and the thickness D3 of the antifog layer 43 may be larger than the thickness D1 of the blocking layer 2 or smaller than the thickness D1 of the blocking layer 2. It should be noted that, when the sum of the thickness D2 of the substrate film 42 and the thickness D3 of the antifog layer 43 is larger than the thickness D1 of the blocking layer 2, it is possible to prevent the blocking layer 2 from physically interfering while the antifog sheet 4 is being attached in the same manner as in the above-described embodiment.

3.8

For example, with the above-described embodiment, the attachment indication marks 45 are provided on the substrate film 42 of the antifog sheet 4. However, the attachment indication marks 45 may also be omitted as appropriate. Moreover, the number, arrangement, and shape of the attachment indication marks 45 may be selected as appropriate according to the embodiment.

3.9

For example, with the above-described embodiment, the antifog sheet 4 is formed in a rectangular shape in a plan view, and the corner portions 46 are rounded. However, the shape of the antifog sheet 4 is not limited to such a shape and may be selected as appropriate according to the embodiment. Similarly, with the above-described embodiment, the information acquisition region 3 is shown as a rectangular region, and the opening 23 is formed in a rectangular shape. However, there is no limitation to such an example. The shape of the information acquisition region 3 may be set as appropriate depending on the information acquisition device to be used, and the shape of the opening 23 may be determined as appropriate such that the information acquisition device can acquire information about the outside of a vehicle. For example, the opening 23 may have a circular shape, an elliptic shape, an eye shape, a trapezoidal shape, or the like.

Moreover, in the above-described diagrams, the four corner portions 46 have the same roundness. However, at least one of the four corner portions 46 need not be rounded. Moreover, at least one of the four corner portions 46 may have a smaller curvature of roundness than those of the other corner portions 46. The antifog sheet 4 may be replaced from the viewpoint of durability. In this case, the smaller the curvature of the roundness of the corner portion 46 is, that is, the sharper the corner portion 46 is, the more easily the antifog sheet 4 is to remove using the corner portion 46 as a starting point. Therefore, providing a corner portion 46 having a smaller curvature of roundness than those of the other corner portions 46 makes it possible to enhance the workability of replacing the antifog sheet 4. However, if the curvatures of all of the corner portions 46 are reduced, there is a possibility that the antifog sheet 4 will be more likely to peel away. Therefore, it is preferable that only one of the corner portions 46 has a small curvature as described above, and the other three corner portions 46 have large curvatures. This makes it possible to suppress the spontaneous detachment of the antifog sheet 4 and to enhance the workability of replacing the antifog sheet 4.

3.10

With the above-described embodiment, the antifog sheet 4 is formed to have a rectangular cross section. However, the cross-sectional shape of the antifog sheet 4 need not be limited to such an example and may be selected as appropriate according to the embodiment.

Figure 16:
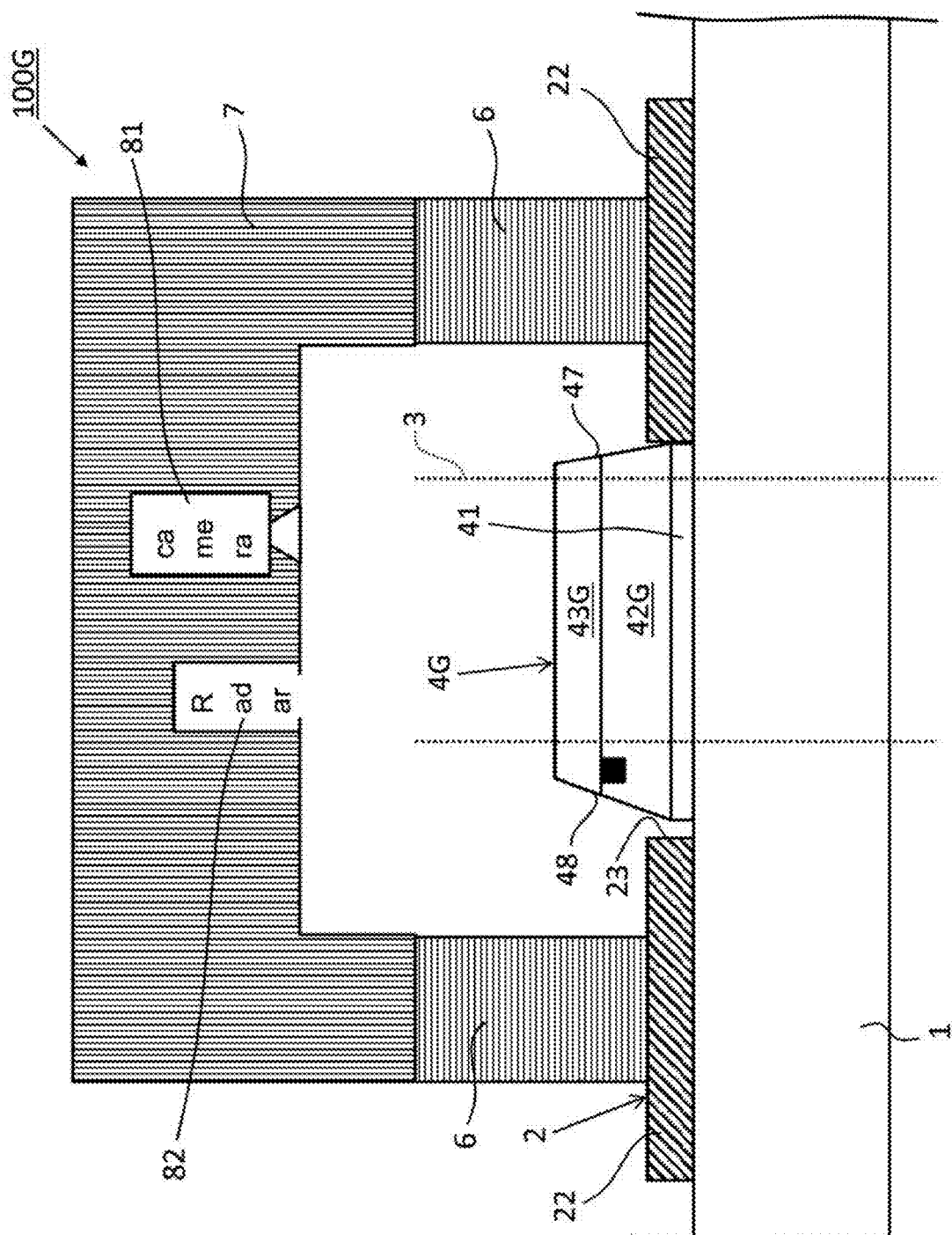
FIG. 16 is a schematic cross-sectional view showing an example of an antifog sheet according to yet another embodiment.

For example, a shape shown in the example in FIG. 16 may be employed. FIG. 16 schematically shows an example of a windshield 100G in which an antifog sheet 4G formed to have a trapezoidal cross section is attached to the information acquisition region 3. In this windshield 100G, the antifog sheet 4G is formed to have a trapezoidal cross section in which a side on an antifog layer 43G side is shorter than a side on a substrate film 42G side.

Accordingly, as shown in the example in FIG. 16, when the antifog sheet 4G is attached so as to fit in the opening 23, gaps can be formed between legs (47, 48) of the trapezoidal shape and the edge of the opening 23. Therefore, even when the temperature around the antifog sheet 4G rises, the antifog sheet 4G can thermally expand by the amount corresponding to the gaps. Accordingly, with this modified example, it is possible to suppress the detachment of the antifog sheet 4G caused by the thermal expansion of the antifog sheet 4G.

Furthermore, in the modified example shown in the example in FIG. 16, the camera 81 and the radar 82 are lined up in the horizontal direction. In the trapezoidal shape seen in the antifog sheet 4G, a leg 48 located on the side on which the radar 82 is arranged is inclined at a larger angle than an angle at a leg 47 located on the side on which the camera 81 is arranged is inclined. That is, when the laminated glass 1 side is taken as the lower side, the leg 47 located on the side on which the camera 81 is arranged is inclined at an angle closer to the vertical direction compared to the leg 48 located on the side on which the radar 82 is arranged.

As described above, when the camera 81 and the radar 82 are compared, the angle of view, namely the information acquisition region 3, required for the camera 81 is wider than that required for the radar 82. To address this, with this modified example, the inclination angle of the leg 47 on the side on which the camera 81 is arranged is set to be smaller than or equal to the inclination angle of the leg 48 on the side on which the radar 82 is arranged (i.e., the inclination angle of the leg 47 with respect to the surface of the laminated glass 1 is set not to be close to the horizontal direction), thus making it possible to make it less likely that the leg 47 of the antifog sheet 4G enters the angle of view of the camera 81. Accordingly, it is possible to prevent the edge of the antifog sheet 4G from entering the angle of view and thereby inhibiting the camera 81 from taking images.

It should be noted that the antifog sheet 4G having such a trapezoidal cross section can be produced as appropriate. For example, a flat-shaped antifog sheet having a rectangular cross section is prepared as in the above-described embodiment, and is then cut from the antifog layer side using an NC machine tool. At this time, cutting an antifog sheet with a cutter blade not in the vertical direction but in the oblique direction makes it possible to form the antifog sheet 4G having a trapezoidal cross section.

3.11

Various types of interlayers can be employed as the interlayer 13 of the laminated glass 1. For example, an interlayer containing heat-ray absorbing particles such as ITO (Indium Tin Oxide) particles or ATO (Antimony Tin Oxide) particles may be used.

Figure 17:
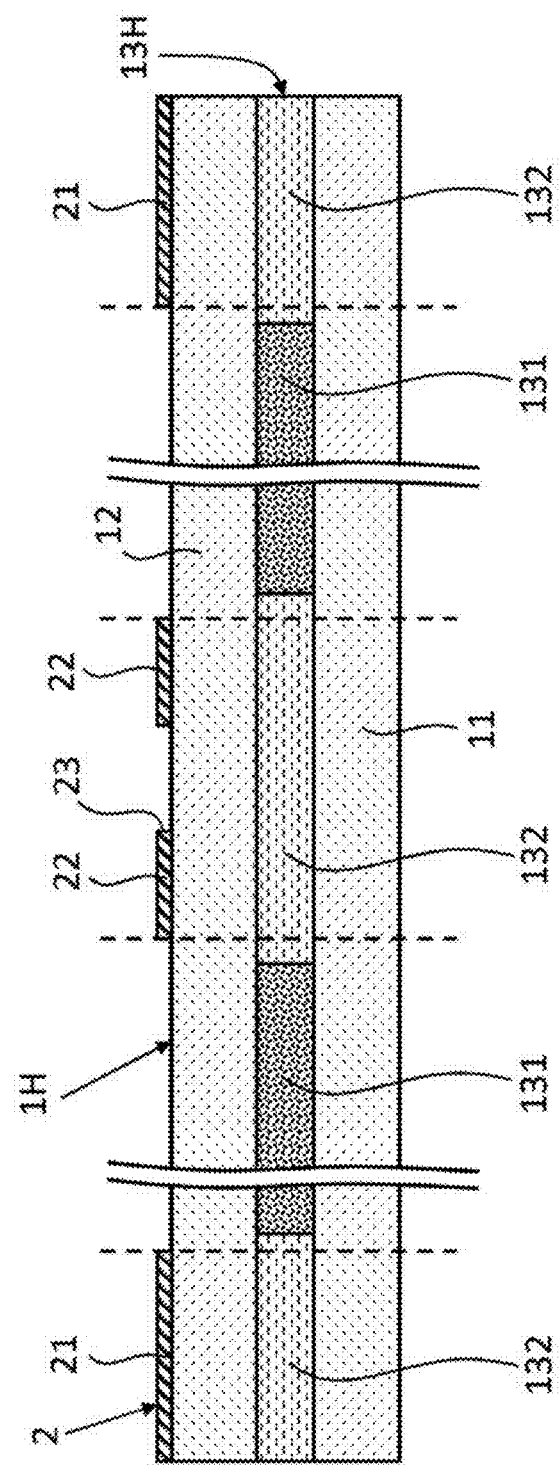
FIG. 17 is a schematic cross-sectional view showing an example of an interlayer according to another embodiment.

For example, a configuration shown in the example in FIG. 17 may be employed. FIG. 17 is a schematic cross-sectional view of a laminated glass 1H according to this modified example. As shown in FIG. 17, an interlayer 13H according to this modified example is divided into two types of regions, namely a first region 131 and a second region 132. The first region 131 does not overlap the blocking layer 2 and the opening 23 in a plan view. On the other hand, the second region 132 overlaps the blocking layer and the opening 23 in a plan view. With this modified example, the heat-ray absorbing particles as described above are not arranged in the second region 132, and are arranged in the first region 131.

With this modified example, the heat-ray absorbing particles are not arranged in the information acquisition region (opening 23), thus making it possible to suppress an influence of the particles on the acquisition of information by the camera 81 and the radar 82. Moreover, the particles are not arranged at a position overlapping the blocking layer 2 in a plan view, thus making it possible to allow light from the outside of a vehicle to reach the blocking layer 2 arranged on the surface on the vehicle interior side of the laminated glass 1. This makes it likely that the blocking layer 2 becomes warm, and due to the heat of the blocking layer 2 in addition to the effect of the antifog sheet 4, it is possible to make it less likely that dew condensation occurs on the glass plate 1.

It should be noted that such an interlayer 13H can be produced as follows, for example. That is, a first interlayer that contains heat-ray absorbing particles and a second interlayer that does not contain the particles are prepared and layered, and a portion at which the second region 132 is to be formed is cut out. Then, the cutout portion of the first interlayer is replaced with the cutout portion of the second interlayer. The interlayer 13H can thus be produced (see Japanese Patent No. 4442863, for example). CWO (Cesium Tungsten Oxide) particles, which are used as an infrared ray blocking material, are not heat-ray absorbing particles. Therefore, in the above-mentioned modified example, the CWO particles may be contained in the second region 132.

3.12

With the above-described embodiment, the substrate film 42 is constituted by a single layer. However, the substrate film 42 may also be constituted by a plurality of layers such that thermal conductivity decreases. With this configuration, heat exchange between the laminated glass 1 and the antifog layer 43 can be further blocked, thus making it possible to prevent a decrease in temperature near the antifog layer 43 and thereby suppress impairment of the antifog function.

3.13

The antifog sheet need not be limited to the above-described film material and may be selected as appropriate according to the embodiment as long as it can be layered on the surface on the vehicle interior side of the laminated glass 1. For example, a PET substrate or the like serving as a substrate film is attached, via a sticky layer, to a region of the surface on the vehicle interior side of a laminated glass on which an antifog sheet is to be layered. Subsequently, a liquid agent is applied to the PET substrate through spraying or flow coating to form an antifog layer. At this time, a region other than the region on which an antifog layer is to be formed is masked. Masking can be performed using a frame material made of silicone, for example. When a frame material made of silicone is used for masking, a liquid agent can be applied to the region on which an antifog layer is to be formed by pouring the liquid agent on this frame material. Subsequently, the glass plate is subjected to preliminary firing (e.g., at 120° C. for 10 minutes) with the frame material made of silicone being attached thereto. Then, the frame material made of silicone is removed, and the glass plate is subjected to final firing at a high temperature and a high humidity (80° C., 90%) for 30 minutes. A glass plate on which an antifog sheet is layered can thus be produced. It should be noted that, at this time, a liquid agent with a liquid composition similar to that of the above-described antifog layer 43 may also be used to form a coating serving as an antifog layer.

3.14

The antifog layer can also be applied directly to the information acquisition region of the laminated glass. That is, a region on which the antifog layer is to be applied is delimited using masking tape on the surface on the vehicle interior side of the laminated glass, and a liquid agent is applied inside this region as described in 3.13. The antifog layer can thus be formed.

3.15

With the above-described embodiment, the inner glass plate 12 and the outer glass plate 11 of the laminated glass 1 are constituted by float glass, but there is no limitation thereto. That is, a configuration can be employed in which the laminated glass 1 according to the present invention may include at least one glass plate where the surface concentrations of tin oxide in its two principal surfaces are different, and such a glass plate is arranged such that a surface thereof in which the concentration of tin oxide is higher is located on the vehicle interior side. Also, the outer glass plate 11 to which an antifog sheet 3 is not attached can be made of glass other than float glass. Also, two or more glass plates can be used to form the laminated glass.

EXAMPLES

Hereinafter, examples of the present invention will be described. However, the present invention is not limited to the following examples.

In the following description, windshields according to an example and a comparative example were prepared and subjected to a high-temperature and high-humidity test. In addition, an alkali elution test and measurement of a tin oxide concentration were performed on the two principal surfaces of each float glass used in the windshields. These will be described successively.

Example (1) Configuration of Laminated Glass

Float glass of a green glass type having a thickness of 2 mm was used for the outer glass plate and the inner glass plate. A single-layer interlayer was arranged therebetween, and a laminated glass was thus produced. At this time, each piece of glass was arranged such that the top surface was in contact with the interlayer.

(2) Mask Layer

A mask layer having the composition shown in Table 1 above and the shape shown in FIG. 1 was formed on the inner surface of the inner glass plate. The size of the opening of the mask layer was set to be 100 mm in the vertical direction and 150 mm in the horizontal direction.

(3) Substrate Film of Antifog Sheet

A PET film (commercially available product) having a thickness of 100 μm was prepared.

(4) Antifog Layer of Antifog Sheet

Polyvinyl acetal resin-containing solution ("S-LEC KX-5" manufactured by Sekisui Chemical Co., Ltd.; a solid content is 8 mass % and a acetalization degree is 9 mol % (including an acetal structure derived from benzaldehyde)): 87.5 mass % n-Hexyltrimethoxysilane (HTMS, "KBM-3063" manufactured by Shin-Etsu Chemical Co., Ltd.): 0.526 mass %

3-Glycidoxypropyltrimethoxysilane (GPTMS, "KBM-403" manufactured by Shin-Etsu Chemical Co., Ltd.): 0.198 mass %

Tetraethoxysilane (TEOS, "KBE-04" manufactured by Shin-Etsu Chemical Co., Ltd.): 2.774 mass %

Alcohol solvent ("Solmix AP-7" manufactured by Alcohol Trading Co., Ltd.): 5.927 mass %

Purified water: 2.875 mass %

Hydrochloric acid serving as an acid catalyst: 0.01 mass %

Leveling agent ("KP-341" manufactured by Shin-Etsu Chemical Co., Ltd.): 0.01 mass %

These were placed in a glass container and stirred at room temperature (25° C.) for 3 hours. A coating solution for forming an antifog layer was thus prepared.

Next, the coating solution was applied onto the above-described substrate film using a flow coating method in an environment with a room temperature of 20° C. and a relative humidity of 30%. After drying was performed for 10 minutes in the same environment, (preliminary) heating process was performed at 120° C. Thereafter, high-temperature and high-humidity treatment was performed by applying the above-described atmosphere and time. Furthermore, additional heat treatment was performed by similarly applying the above-described atmosphere and time.

(5) Sticky Layer of Antifog Sheet

A polymer was prepared by copolymerizing methyl acrylate and n-butyl acrylate at a predetermined blending ratio such that a glass transition temperature Tg was adjusted to −36° C., and this polymer was dissolved in toluene and used as a gluing agent. A meyer bar was used to apply this solution, and a sticky layer was thus formed.

(6) Production of Windshield

A mask layer material was screen-printed on the surface on the vehicle interior side of the above-described inner glass plate to form a mask layer. Next, a mold as shown in FIG. 10 was used, and the outer glass plate and the inner glass plate were fired at 650° C. in a heating furnace and molded into a curved shape. Then, these glass plates were conveyed out of the heating furnace and annealed. Subsequently, the interlayer was arranged between the glass plates, and preliminary bonding and permanent bonding were performed as described in the embodiment above. Thereafter, to an opening on the inner surface of the inner glass plate, the above-described antifog sheet with a size that was slightly smaller than that of the opening was attached. Therefore, with the windshield of the example, the antifog sheet was attached to the bottom surface of the float glass included in the laminated glass.

Comparative Example (1) Configuration of Laminated Glass

A laminated glass was formed in the same manner as the laminated glass of the example, except that the inner glass plate was arranged such that the bottom surface was in contact with the interlayer.

(2) Mask layer, (3) Substrate film of antifog sheet, (4) Antifog layer of antifog sheet, (5) Sticky layer of antifog sheet, and (6) Production of windshield were the same as those in the above-described example. Therefore, with the windshield of the comparative example, the antifog sheet was attached to the top surface of the float glass included in the laminated glass.

Evaluation Tests (1) High-Temperature and High-Humidity Test

A high-temperature and high-humidity test was performed on the windshields of the example and the comparative example. In the high-temperature and high-humidity test, the following evaluation was performed.

The windshields of the example and the comparative example were held in an atmosphere at a temperature of 85° C. and a relative humidity of 95% for 1000 hours.

After the holding was finished, the external appearance of the windshields was visually observed, and the haze ratios at the portions to which the antifog sheets had been attached were measured.

The haze ratios were measured using an integrating sphere-type light transmittance measurement apparatus ("HGM-2DP", manufactured by Suga Test Instruments Co., Ltd.; a C light source was used, and light was made incident from the membrane surface side).

As a result, in both the windshields, the portion to which the antifog sheet had been attached was more opaque than the portion to which the antifog sheet had not been attached. The degree of opacity was greater in the comparative example. As a reference, FIG. 18 shows pieces obtained by cutting out, from the example and the comparative example, the regions to which the antifog sheets had been attached. The haze ratio of the portions to which the antifog sheet had been attached was 3.5% in the example, whereas it was 7.6% in the comparative example. An evaluated haze ratio of 4% or less is allowable for window glass for an automobile, and it was thus found that the example was allowable, but the comparative example was not allowable.

(2) Alkali Elution Test on Float Glass

The used float glass was tested for alkali eluted from the top surface and the bottom surface. In the alkali elution test, the following evaluation was performed.

Two 5-cm square test pieces were cut out from the same glass as that used in the example and the comparative example. These test pieces were heated to 650° C. in a heating furnace and then annealed to room temperature. This operation corresponds to the temperature history experienced by the windshields of the example and the comparative example during firing, molding, and annealing.

Next, each of the test pieces was washed, and one principle surface thereof was masked while the other principle surface was exposed. Samples were thus prepared. That is, only the top surface was exposed in one sample, and only the bottom surface was exposed in the other sample.

The prepared samples were held in an atmosphere at a temperature of 60° C. and a relative humidity of 100% for 168 hours.

After the holding was finished, alkali components deposited on the exposed surfaces of the samples were collected and quantified to measure the amount of eluted alkali. That is, the exposed surfaces of the samples were washed using purified water, and all of the washing water was collected. Sodium contained in the water was subjected to a quantitative analysis using a common method, and alkali components deposited on the exposed surface from the inside of the glass were thus quantified.

As a result, the amounts of alkali deposited on the bottom surface, which corresponded to the example, and the top surface, which corresponded to the comparative example, were 0.3 μg/cm$^2$ and 0.8 μg/cm$^2$, respectively.

(3) Concentration of Tin Oxide in Surface of Float Glass

The concentrations of tin oxide near the top surface and the bottom surface of the used float glass were evaluated.

Two 5-cm square test pieces were cut out from the same glass as that used in the example and the comparative example and washed. The concentrations of tin oxide were measured using an electron probe micro analyzer (EPMA) and a wavelength dispersive X-ray detector (WDX) provided therein. Specifically, a WDX analysis (acceleration voltage: 15 kV, sample current: 2.5×10$^{-7}$ A, scan speed: 66 μm/minute, analyzing crystal: PET) was performed using an EPMA (JXA8600, manufactured by JEOL Ltd.). Divalent Sn and tetravalent Sn were converted into tetravalent Sn based on the measurement results.

As a result, the maximum concentrations of tin oxide in terms of SnO$_2$ within a range of 10 μm deep from the bottom surface and the top surface were 2.5 mass % and 0.1 mass %, respectively.

It was found from these results that, when at least one of the glass plates included in a windshield was constituted by a glass plate in which the contents of tin oxide in the two principal surfaces are different, and an antifog sheet was attached to the surface in which the content of tin oxide was high, it was possible to reduce the amount of sodium diffusing from the glass plate to the antifog sheet, particularly to the sticky layer of the antifog sheet, thus making it possible to efficiently suppress opacity of the antifog sheet after the high-temperature and high-humidity test, which corresponds to an index of durability.

LIST OF REFERENCE NUMERALS

100 . . . Windshield
1 . . . Glass plate,
11 . . . Outer glass plate, 12 . . . Inner glass plate, 13 . . . Interlayer,
2 . . . Blocking layer,
4 . . . Antifog sheet,
41 . . . Sticky layer, 42 . . . Substrate film, 43 . . . Antifog layer,
6 . . . Bracket,
61 . . . Attachment opening, 62 . . . Main body, 63 . . . Supporting portion,

The invention claimed is:

1. A windshield for an automobile on which at least one information acquisition device configured to acquire information from outside of a vehicle by emitting and/or receiving light is to be suitably arranged, the windshield comprising:
  a laminated glass including at least one information acquisition region through which the light passes; and
  an antifog sheet in which at least a sticky layer, a substrate film, and an antifog layer are layered in this order, the sticky layer being disposed on a vehicle interior side of the information acquisition region of the laminated glass,
  wherein the laminated glass comprises an inner glass plate arranged on a vehicle interior side, an outer glass plate arranged on a vehicle exterior side, and an interlayer arranged between the inner glass plate and the outer glass plate,
  the outer glass plate and the inner glass plate are both made of float glass and each have principal top and bottom surfaces,
  the top and bottom surfaces have different surface concentrations of tin oxide with the bottom surface having a higher tin oxide concentration than the top surface,
  the bottom surface has a tin oxide concentration of 1 to 10 mass %,
  the top surface has a tin oxide concentration of 0.1 to 1 mass %,
  the sticky layer of the antifog sheet is directly attached to the bottom surface of the inner glass plate, and
  the top surface of the inner glass plate and the top surface of the outer glass plate are in contact with the interlayer.

2. The windshield according to claim 1, further comprising:
  a blocking layer that is provided on the laminated glass, blocks a field of vision from the outside of the vehicle, and is provided with an opening arranged to correspond to the at least one information acquisition region; and
  a bracket for attaching the at least one information acquisition device at a position that is opposite to the opening, wherein the bracket is arranged around the opening and fixed such that at least a portion of the bracket is blocked by the blocking layer.

3. The windshield according to claim 2, wherein a planar size of the antifog sheet is larger than a planar size of the opening of the blocking layer.

4. The windshield according to claim 3, wherein
  the bracket is formed in a frame shape, and
  the planar size of the antifog sheet is smaller than an internal size of the bracket.

5. The windshield according to claim 2, wherein a planar size of the antifog sheet is smaller than a planar size of the opening of the blocking layer.

6. The windshield according to claim 2, wherein
  a planar size of the opening of the blocking layer is larger than a planar size of the information acquisition region, and
  a planar size of the antifog sheet is larger than the planar size of the information acquisition region and smaller than the planar size of the opening of the blocking layer.

7. The windshield according to claim 2, wherein at least a portion of an edge of the antifog sheet is in contact with an edge of the opening of the blocking layer.

8. The windshield according to claim 2,
wherein an imaging device for taking images of the outside of the vehicle through the at least one information acquisition region and a laser device for emitting and/or receiving a ray of light that serves as the at least one information acquisition device[s] are lined up in a horizontal direction, and
a portion where the edge of the opening of the blocking layer and the edge of the antifog sheet are in contact with each other is arranged on the imaging device side.

9. The windshield according to claim 1, wherein a total thickness of the substrate film and the antifog layer of the antifog sheet is larger than a thickness of the blocking layer.

10. The windshield according to claim 1,
wherein the interlayer contains heat-ray absorbing particles, and
the particles are not arranged in a region of the interlayer that overlaps the blocking layer and the opening in a plan view, and are arranged in another region.

11. The windshield according to claim 1, wherein
the antifog layer contains at least one type of polymer selected from the group consisting of urethane resin, epoxy resin, acrylic resin, polyvinyl acetal resin, and polyvinyl alcohol resin, and
the polymer is contained in an amount of 50 mass % or more and 99 mass % or less.

12. The windshield according to claim 1, wherein
the antifog sheet is formed in a rectangular shape in a plan view, and
corner portions of the antifog sheet are rounded.

13. The windshield according to claim 12, wherein at least one corner portion of the corner portions of the antifog sheet has a smaller radius of curvature of roundness than those of the other corner portions.

14. The windshield according to claim 1, wherein the substrate sheet is made of a material having a thermal conductivity of $5 \times 10^{-4}$ cal/cm·sec·° C. or less.

15. The windshield according to claim 1, wherein the antifog sheet is formed to have a trapezoidal cross section in which a side located on the antifog layer side is shorter than a side located on the substrate film side.

16. The windshield according to claim 15,
wherein an imaging device for taking images of the outside of the vehicle through the at least one information acquisition region and a laser device for emitting and/or receiving a ray of light that serves as the at least one information acquisition device[s], and
in the trapezoidal shape seen in the antifog sheet, a leg located on a side on which the laser device is arranged is inclined at a larger angle than an angle at a leg located on a side on which the imaging device is arranged is inclined.

17. The windshield according to claim 1, wherein the substrate film includes a plurality of layers.

18. The windshield according to claim 1, wherein the interlayer comprises a resin material.

19. A windshield for an automobile on which at least one information acquisition device configured to acquire information from outside of a vehicle by emitting and/or receiving light is to be suitably arranged, the windshield comprising:
a laminated glass including at least one information acquisition region through which the light passes; and
an antifog sheet in which at least a sticky layer, a substrate film, and an antifog layer are layered in this order, the sticky layer being disposed on a vehicle interior side of the information acquisition region of the laminated glass,
wherein the laminated glass further includes an inner glass plate arranged on a vehicle interior side, an outer glass plate arranged on a vehicle exterior side, and an interlayer arranged between the inner glass plate and the outer glass plate,
the outer glass plate and the inner glass plate are both made of float glass and each have principal top and bottom surfaces,
the top and bottom surfaces have different surface concentrations of tin oxide with the bottom surface having a higher tin oxide concentration than the top surface,
the bottom surface has a tin oxide concentration of 1 to 10 mass %,
the top surface has a tin oxide concentration of 0.1 to 1 mass %,
the sticky layer of the antifog sheet is directly attached to the bottom surface of the inner glass plate, and
the top surface of the inner glass plate and the bottom surface of the outer glass plate are in contact with the interlayer.

* * * * *